United States Patent
Jeanson et al.

(10) Patent No.: US 10,012,138 B2
(45) Date of Patent: Jul. 3, 2018

(54) EXHAUST BYPASS VALVE OF MULTI-STAGE TURBOCHARGER

(71) Applicant: Honeywell International Inc., Morris Plains, NJ (US)

(72) Inventors: Arthur Jeanson, Chatel sur Moselle (FR); Bassam Chammas, Epinal (FR); Jean-Luc Perrin, Girmont (FR)

(73) Assignee: Honeywell International Inc., Morris Plains, NJ (US)

( * ) Notice: Subject to any disclaimer, the term of this patent is extended or adjusted under 35 U.S.C. 154(b) by 137 days.

(21) Appl. No.: 14/964,798

(22) Filed: Dec. 10, 2015

(65) Prior Publication Data

US 2017/0167364 A1     Jun. 15, 2017

(51) Int. Cl.
| | |
|---|---|
| *F02D 23/00* | (2006.01) |
| *F02B 33/44* | (2006.01) |
| *F02B 33/00* | (2006.01) |
| *F01D 11/00* | (2006.01) |
| *F02B 37/18* | (2006.01) |

(Continued)

(52) U.S. Cl.
CPC ............ *F02B 37/186* (2013.01); *F01D 11/00* (2013.01); *F01D 17/141* (2013.01); *F01D 17/146* (2013.01); *F01D 25/30* (2013.01); *F02B 37/004* (2013.01); *F02B 37/013* (2013.01); *F02C 6/12* (2013.01); *F05D 2220/40* (2013.01); *Y02T 10/144* (2013.01)

(58) Field of Classification Search
CPC .... F02B 37/186; F02B 37/004; F02B 37/013; F01D 11/00; F05D 2220/40
USPC ........ 60/602, 612; 417/407; 415/111, 170.1; 123/562
See application file for complete search history.

(56) References Cited

U.S. PATENT DOCUMENTS

| | | | |
|---|---|---|---|
| 7,134,836 B2 | 11/2006 | Scherrer | |
| 7,644,583 B2 * | 1/2010 | Leavesley | ............. F02B 37/183 60/602 |

(Continued)

FOREIGN PATENT DOCUMENTS

| | | |
|---|---|---|
| DE | 10 2009 007 364 A1 | 8/2010 |
| DE | 10 2013 011 106 A1 | 1/2015 |
| EP | 2 530 275 A2 | 12/2012 |

OTHER PUBLICATIONS

A Machine Translation copy to Kloft (Pub. No. DE 10 2013 011 106 A1), published on Jan. 8, 2015.*

(Continued)

*Primary Examiner* — Thai Ba Trieu
(74) *Attorney, Agent, or Firm* — Brian J. Pangrle

(57) ABSTRACT

An assembly for a two-stage turbocharger can include a first turbocharger stage and a second turbocharger stage where one of the stages includes a boss that includes a bore; an exhaust bypass valve that includes an arm pivotable to orient the exhaust bypass valve in an open state and a closed state; a valve shaft disposed at least in part in the bore and operatively coupled to the exhaust bypass valve where the valve shaft includes an inner end, an outer end and an axial stop disposed between the inner end and the outer end; an outer bushing disposed at least in part in the bore and located axially along the valve shaft; and an inner bushing disposed at least in part in the bore and located axially along the valve shaft between the axial stop and a portion of the arm of the exhaust bypass valve.

14 Claims, 20 Drawing Sheets

(51) Int. Cl.
  *F02B 37/00* (2006.01)
  *F02B 37/013* (2006.01)
  *F01D 17/14* (2006.01)
  *F01D 25/30* (2006.01)
  *F02C 6/12* (2006.01)

(56) References Cited

U.S. PATENT DOCUMENTS

| | | | | |
|---|---|---|---|---|
| 8,667,794 B2* | 3/2014 | Perrin | .................. | F02B 37/183 60/602 |
| 8,671,683 B2 | 3/2014 | Lilly | | |
| 9,163,589 B2* | 10/2015 | Jeanson | ................ | F02B 37/183 |
| 2007/0119170 A1* | 5/2007 | Masson | ................ | F02B 37/183 60/602 |
| 2009/0226304 A1 | 9/2009 | Frankenstein et al. | | |
| 2011/0110767 A1* | 5/2011 | Castan | ................ | F01D 17/165 415/159 |
| 2011/0116910 A1 | 5/2011 | Lilly | | |
| 2012/0260651 A1* | 10/2012 | Boning | ................ | F02B 37/183 60/605.1 |
| 2012/0304952 A1* | 12/2012 | Perrin | ................... | F01D 17/141 123/188.2 |
| 2013/0089411 A1* | 4/2013 | Ward | ................... | F01D 17/165 415/151 |
| 2013/0287552 A1* | 10/2013 | House | ................... | F01D 11/003 415/170.1 |
| 2014/0003908 A1* | 1/2014 | House | ................... | F01D 11/025 415/111 |
| 2015/0226110 A1 | 8/2015 | Wang et al. | | |
| 2015/0292395 A1* | 10/2015 | Dilalan | ................ | F02B 37/183 60/602 |

OTHER PUBLICATIONS

EP Application No. 16196441.6-1616/3179069, EPO Extended European Search Report dated May 30, 2017 (7 pages).

* cited by examiner

EXHAUST BYPASS VALVE OF MULTI-STAGE TURBOCHARGER

TECHNICAL FIELD

Subject matter disclosed herein relates generally to turbomachinery for internal combustion engines and, in particular, to mechanisms for exhaust bypass valves of multi-stage turbochargers.

BACKGROUND

An exhaust bypass valve is often used to control operation of serial turbocharger systems. Such a valve may be operated to physically divert exhaust or alter pressures in exhaust pathways, for example, to direct exhaust flow partially or fully to one of multiple turbines in a system. During operation, an exhaust bypass valve experiences high exhaust pressure on one side and lower pressure on the other side. To effectively seal the high pressure environment from the low pressure environment, considerable force is required to maintain contact between a valve and a valve seat. In a sealed state of a valve and valve seat, pressure differentials may challenge one or more inter-component seals and result in detrimental exhaust leakage.

During operation of a valve, some amount of axial movement can occur, for example, consider axial movement associated with an amount of axial play that exists between various components. As an example, engine vibration may be a source of energy that causes movement of one or more components within an axial play limit or limits. As an example, exhaust pulsations may be a source of energy that causes movement of one or more components within an axial play limit or limits. As an example, the amount of wear experienced by an assembly can depend the amount of axial play where, for example, the larger the amount of axial play, the larger the amount of wear generated via movement of one or more component (e.g., as driven by one or more sources).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
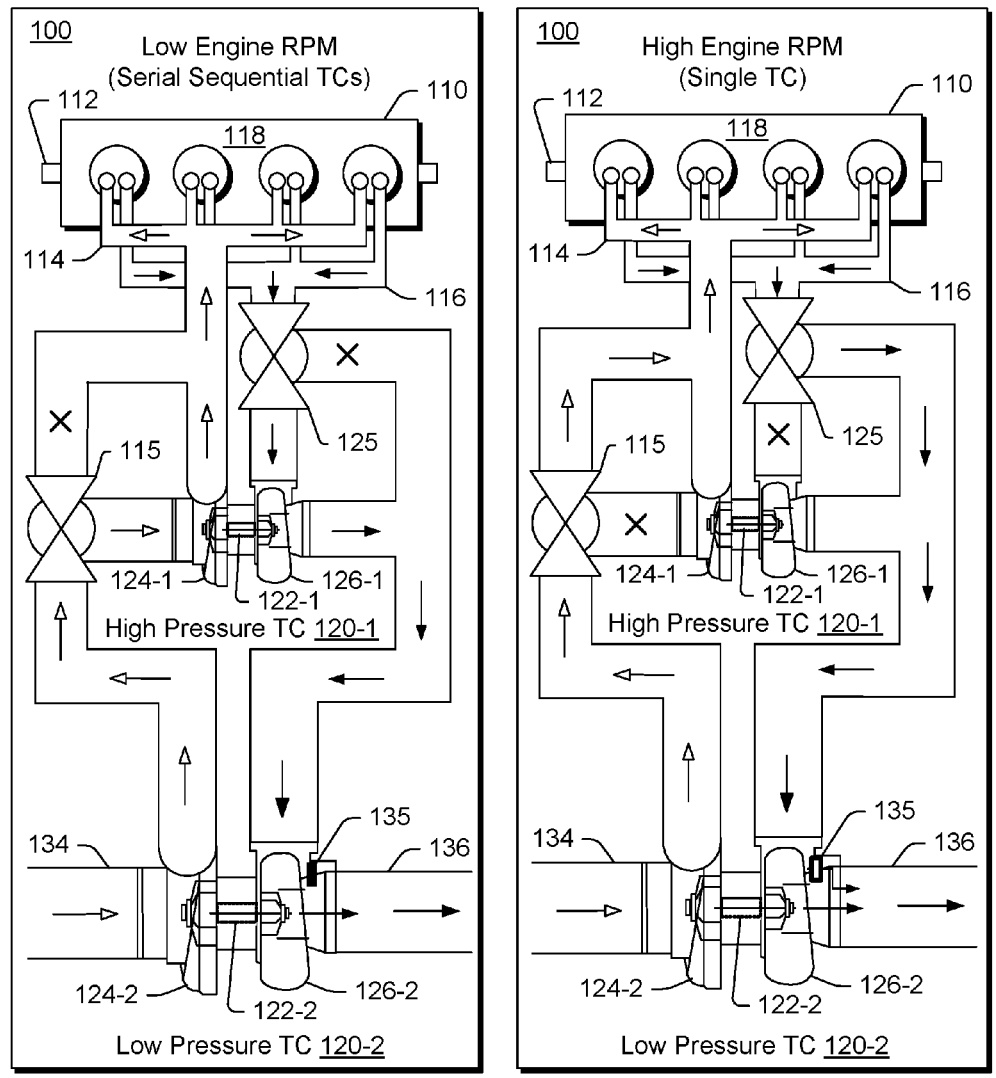
FIG. 1 is a diagram of an example of a system that includes turbochargers and an internal combustion engine along with a controller.
Figure 1:
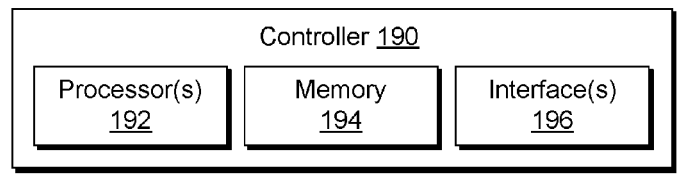

Turbochargers are frequently utilized to increase output of an internal combustion engine. FIG. 1 shows a system 100 in two operational configurations (low engine RPM and high engine RPM) where the system 100 includes an internal combustion engine 110 and turbochargers 120-1 and 120-2 in a serial sequential arrangement.

The internal combustion engine 110 includes an engine block 118 housing one or more combustion chambers that operatively drive a shaft 112 (e.g., via pistons) where rotation of the shaft 112 determines, for example, engine revolutions per minute (RPM). As shown in FIG. 1, an intake manifold 114 provides a flow path for air to the engine block 118 while an exhaust manifold 116 provides a flow path for exhaust from the engine block 118.

Each of the turbochargers 120-1 and 120-2 can act to extract energy from the exhaust and to provide energy to intake air, which may be combined with fuel to form combustion gas. As shown in FIG. 1, each of the turbochargers 120-1 and 120-2 includes a shaft 122-1 and 122-2, a compressor 124-1 and 124-2, and a turbine 126-1 and 126-2. Each of the turbochargers 120-1 and 120-2 may include a housing, which may be referred to as a center housing (e.g., disposed between a respective compressor and turbine). As an example, a turbocharger shaft may be a shaft assembly that includes a variety of components.

As to fluid flow to and from the serial sequential arrangement of turbochargers 120-1 and 120-2, an air intake 134 receives inlet air, which is directed to the compressor 124-2 and an exhaust outlet 136 receives exhaust from the turbine 126-2, which may include an exhaust wastegate valve 135. The wastegate valve 135 can be controlled to allow exhaust to bypass the turbine 126-2.

In the low engine RPM operational state, the turbochargers 120-1 and 120-2 are operated in series, sequentially. Specifically, exhaust from the exhaust manifold 116 is directed first to the turbine 126-1, which causes rotation of the compressor 124-1, and then to the turbine 126-2, which causes rotation of the compressor 124-2. As the turbine 126-1 extracts energy from the exhaust, the exhaust pressure decreases while the compressor 124-1 increases boost pressure (e.g., pressure differential between its inlet and outlet). In the example system 100, based on compressor inlet pressure, the turbocharger 120-1 is referred to as a high pressure turbocharger while the turbocharger 120-2 is referred to as a low pressure turbocharger for the serial sequential operational state. As indicated in FIG. 1, compressed intake air from the compressor 124-2 (e.g., receiving air at atmospheric conditions) is compressed and directed to an inlet of the compressor 124-1 (e.g., receiving the compressed air, which is at a pressure greater than atmospheric). Such an arrangement may be referred to as dual-stage compression.

In the low engine RPM operational state, an air valve 115 may be configured in an orientation that directs compressed air from the compressor 124-2 to the inlet of the compressor 124-1 and an exhaust valve 125 may be configured in an orientation that directs exhaust from the manifold 116 to the turbine 126-1. During operation, either or both of the valves 115 and 125 may be regulated. For example, the valve 115 may be regulated such that at least some intake air bypasses the compressor 124-1 and the valve 125 may be regulated such that at least some exhaust bypasses the turbine 126-1. Such regulation may occur while the system 100 is maintained in a serial sequential operational state. In contrast, when the air valve 115 is configured in an orientation that causes full or substantial bypass of the compressor 124-1 and when the exhaust valve is configured in an orientation that causes full or substantial bypass of the turbine 126-1, the system 100 operates fully or essentially as a single turbocharger system. Such an operational state is typically selected for high engine RPM.

As the high engine RPM operational state relies on the turbocharger 120-2 and as high engine RPM logically follows low engine RPM, regulation of the exhaust valve 125 can act to pilot the low pressure turbocharger 120-2. For example, when a preset engine RPM or boost pressure is reached, a controller may actuate the exhaust valve 125 to increase flow of exhaust to the turbine 126-2 (e.g., via physical diversion or pressure differential). In such a scenario, the increased flow to the turbine 126-2 increases rotational speed of the shaft 122-2, which prepares the turbocharger 120-2 for a more rapid response and power output (e.g., with minimum turbo lag) upon configuration of the exhaust valve 125 in an orientation that causes full or significant bypass of the turbine 126-1.

The system 100 may also include other features, for example, a heat exchanger (e.g., or heat exchangers) may be positioned to cool compressed intake air prior to delivery of the compressed air to the combustion chambers of the engine 110. As an example, a heat exchanger may include a water-cooled compressor housing. As described herein, the system 100 may include one or more exhaust gas recirculation paths that can circulate exhaust to intake air; noting that exhaust valves and intake valves for combustion chambers of the engine 110 may be appropriately controlled to achieve some degree of exhaust "recirculation" (e.g., retention in a chamber).

In FIG. 1, an example of a controller 190 is shown as including one or more processors 192, memory 194 and one or more interfaces 196. Such a controller may include circuitry such as circuitry of an engine control unit. Such a controller may include circuitry that provides for reading, writing or reading and writing information (e.g., executable instructions, control instructions, data, etc.) to memory (e.g., a computer-readable storage medium). As described herein, various methods or techniques may optionally be implemented in conjunction with a controller, for example, through control logic. Control logic may depend on one or more engine operating conditions. For example, sensors may transmit information to the controller 190 via the one or more interfaces 196. Control logic may rely on such information and, in turn, the controller 190 may output control signals to control engine operation. The controller 190 may be configured to control an air valve (see, e.g., the air valve 115), an exhaust valve (see, e.g., the exhaust valve 125), a variable geometry assembly, a wastegate (see, e.g., the wastegate 135), an electric motor, or one or more other components associated with an engine, an exhaust turbine (or exhaust turbines), a turbocharger (or turbochargers), etc. With respect to valves, the controller 190 may be configured to act as an actuator or to transmit a signal to an actuator configured to actuate, for example, the air valve 115, the exhaust valve 125, the wastegate valve 135 (e.g., to close or open a wastegate), etc.

Figure 2:
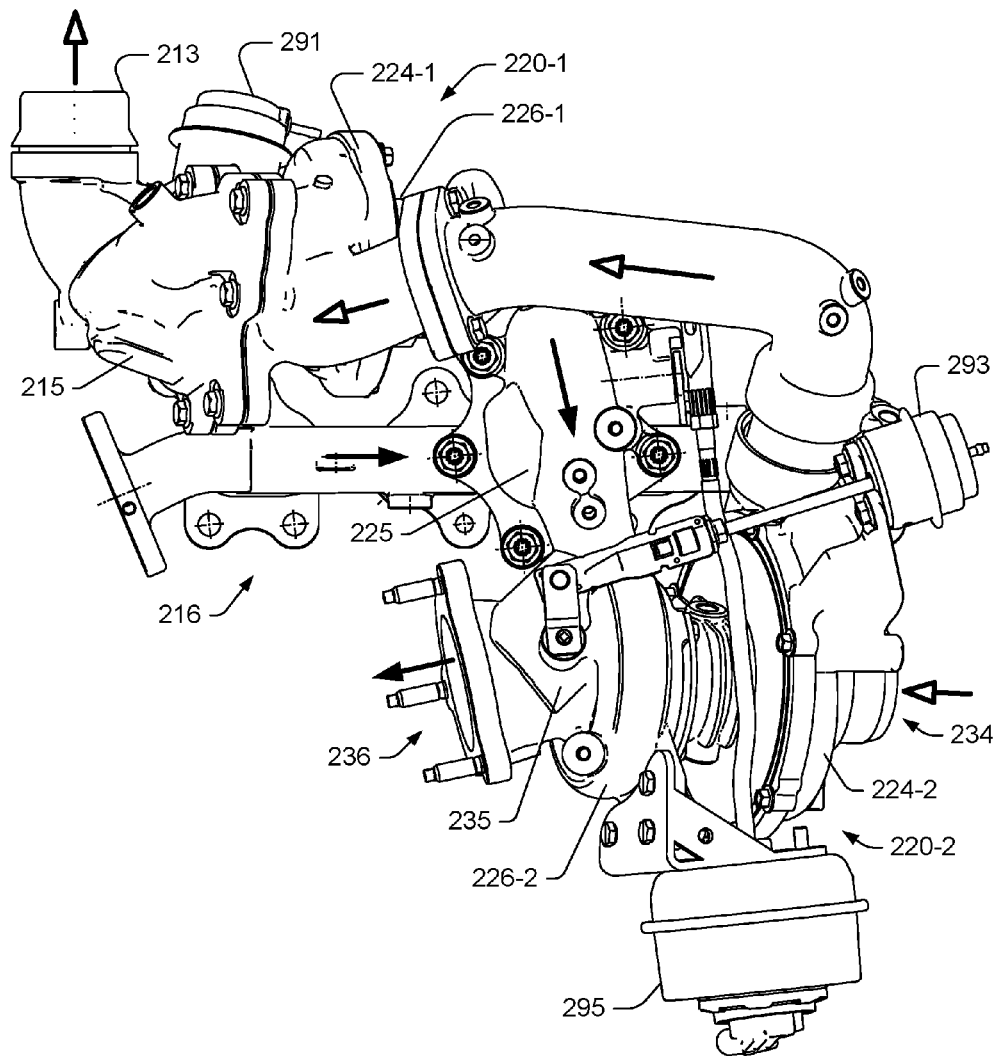
FIG. 2 is a perspective view of an example of a serial sequential turbocharger system.
Figure 3:
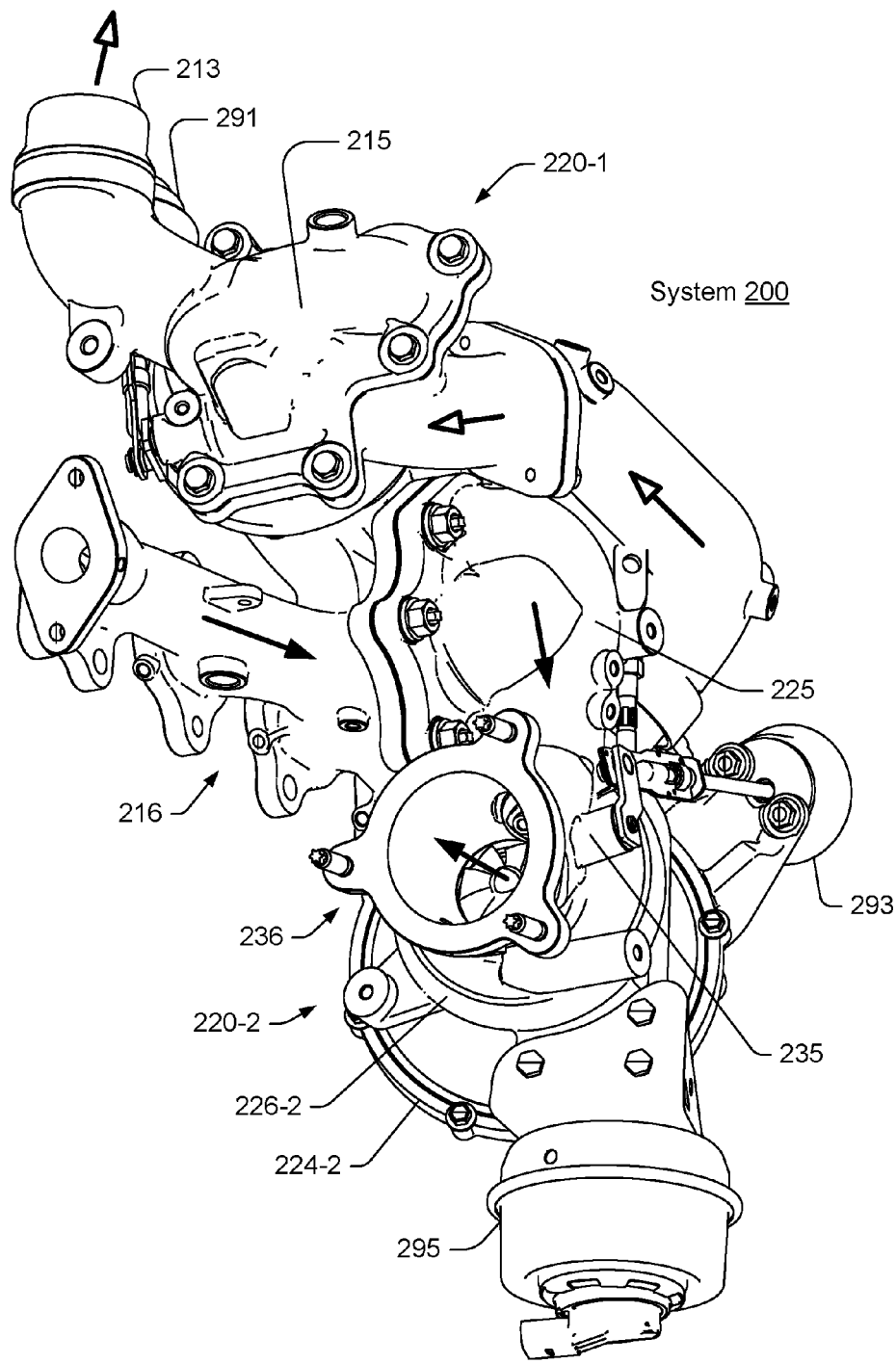
FIG. 3 is another perspective view of the serial sequential turbocharger system of FIG. 2.

FIGS. 2 and 3 show perspective views of a system 200 with two turbochargers 220-1 and 220-2 along with an air outlet 213, an air valve 215, an exhaust manifold 216, an exhaust valve 225, a wastegate 235, an air intake 234, an exhaust outlet 236, an air valve actuator 291, a wastegate actuator 293 and an exhaust valve actuator 295. Open headed arrows indicate intended air flow directions while solid headed arrows indicate intended exhaust flow directions. Each of the turbochargers 220-1 and 220-2 includes a compressor 224-1 and 224-2 and a turbine 226-1 and 226-2.

As described herein, a system capable of serial sequential turbocharger operation and single turbocharger operation may be arranged in any of a variety of manners. For example, an exhaust valve may be located in a variety of positions depending on number, shape and size of exhaust conduits. In general, an exhaust valve acts to cause flow of exhaust predominantly to a larger of the turbochargers, which is often referred to as a low pressure turbocharger in a serial sequential arrangement. As mentioned, an exhaust valve may act to physically bypass a smaller, high pressure turbocharger or it may act to alter pressure in pathways. As to the latter, with reference to the system 200, the exhaust valve 225 may be located adjacent the exhaust manifold 216 such that upon opening of the valve 225, exhaust flows along a lower pressure pathway to the larger turbine 226-2 of the low pressure turbocharger 220-2. In such an arrangement, the exhaust valve 225 can regulate exhaust flow form a high pressure source (e.g., manifold) to a lower pressure pathway.

As described herein, exhaust valve regulation may occur such that an exhaust valve is closed, open or in any intermediate state. In general, an exhaust valve opens in a direction facilitated by a pressure differential and closes in a direction opposed to the pressure differential. Such a valve arrangement provides for easier opening (e.g., less actuator force to open) and, upon failure of an actuator, the valve being in an open or partially open state (e.g., which allows flow of exhaust to the larger turbine). If an exhaust valve were arranged such that actuator failure prevented opening, then, at high engine RPM, exhaust would be first directed to the smaller turbine, which could cause overspeed and potential failure of the smaller turbine (or compressor). Ultimately, however, an exhaust valve should be capable of effectively closing an exhaust opening (e.g., overcoming pressure differentials) such that, for low engine RPM, exhaust is directed to the smaller turbine.

Figure 4:
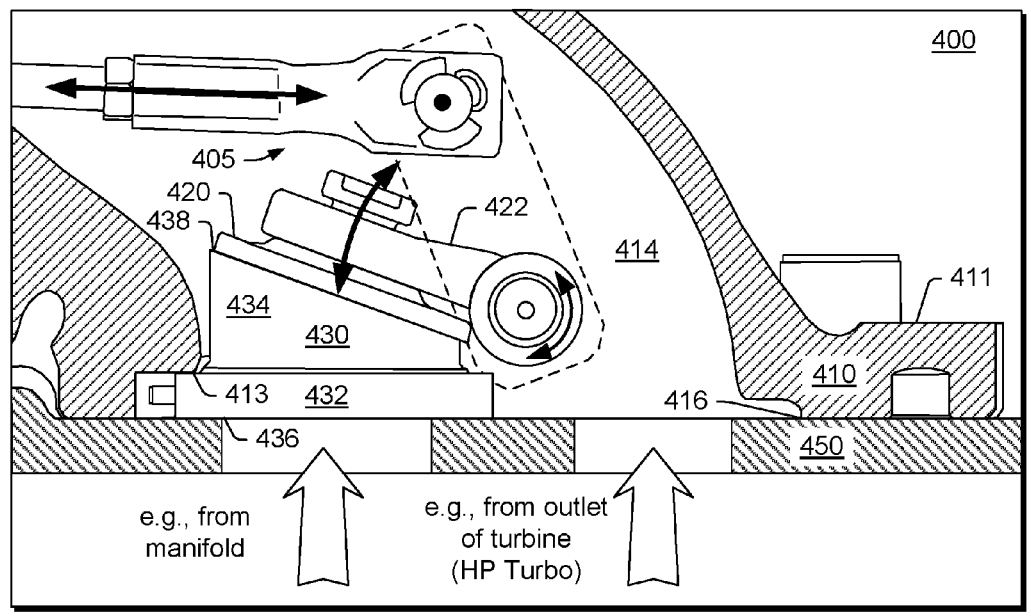
FIG. 4 is a cross-sectional view of an example of an exhaust bypass valve assembly.

FIG. 4 shows an example of an exhaust valve assembly 400 that may receive exhaust, for example, from a manifold and from an outlet of a turbine of a high pressure turbocharger (see, e.g., FIGS. 1, 2 and 3). For example, the assembly 400 includes a housing 410 with an exhaust inlet flange 411 configured to be operatively coupled to another component (e.g., or components) for receipt of exhaust. As shown in FIG. 4, the housing 410 defines a chamber 414 configured for receipt of exhaust, in part, responsive to position of a poppet 420, which is attached to and movable by an arm 422, where the arm 422 may be attached to or linked to an actuator (see, e.g., actuator assembly 405). As described herein, a poppet can act as a plug, for example, to plug or seal an opening (e.g., to plug or seal an opening to an exhaust manifold coupled to an internal combustion engine).

In the example of FIG. 4, the assembly 400 includes a valve seat 430 disposed between the housing 410 and another component 450, which may be a part of a manifold, attached to a manifold, etc. As shown, the valve seat 430 includes a base portion 432 and a wall portion 434 that extends axially away from the base portion 432 (e.g., as a pipe, cylindrical wall, etc.). Where the base portion 432 and the wall portion 434 include substantially circular cross-sections, the base portion 432 can include an outer diameter that exceeds an outer diameter of the wall portion 434. An exhaust passage is defined by an inner surface of the valve seat 430, which may be a substantially cylindrical surface.

In the example assembly 400 of FIG. 4, the housing 410 includes a recess 413 that extends axially inwardly from a face 416 of the housing 410 (e.g., optionally including one or more shoulders, etc.) and that can receive the valve seat 430. In the example assembly 400 of FIG. 4, the valve seat 430 includes a surface 436 and a surface 438, which is disposed at an angle, for example, defined relative to the surface 436, a planar surface of the component 450, the face 416 of the housing 410, etc., upon which the poppet 420 may be seated when the poppet 420 is in a closed state. Such an angle (e.g., a swing angle) may reduce a rotational angle when moving the poppet 420 between an open state and a closed state. As an example, a valve seat may include a surface to seat a poppet where the surface is disposed in an assembly at an angle of about zero degrees. For example, consider the valve seat 430 as having the surface 438 being parallel to the surface 436, which may result in a greater travel distance (e.g., angle of rotation) for the arm 422 to seat the poppet 420 against the surface 438. In such an example, a lower surface of the poppet 420 may be about parallel to the interface between the housing 410 and the component 450 (e.g., and about parallel to a plane of a gasket or gaskets disposed between the housing 410 and the component 450). As an example, an angle may be considered in a force diagram, for example, to consider force applied to a valve seat by a poppet and balance of that force (e.g., as to one or more components that are in directly or indirectly in contact with the valve seat).

Figure 5:
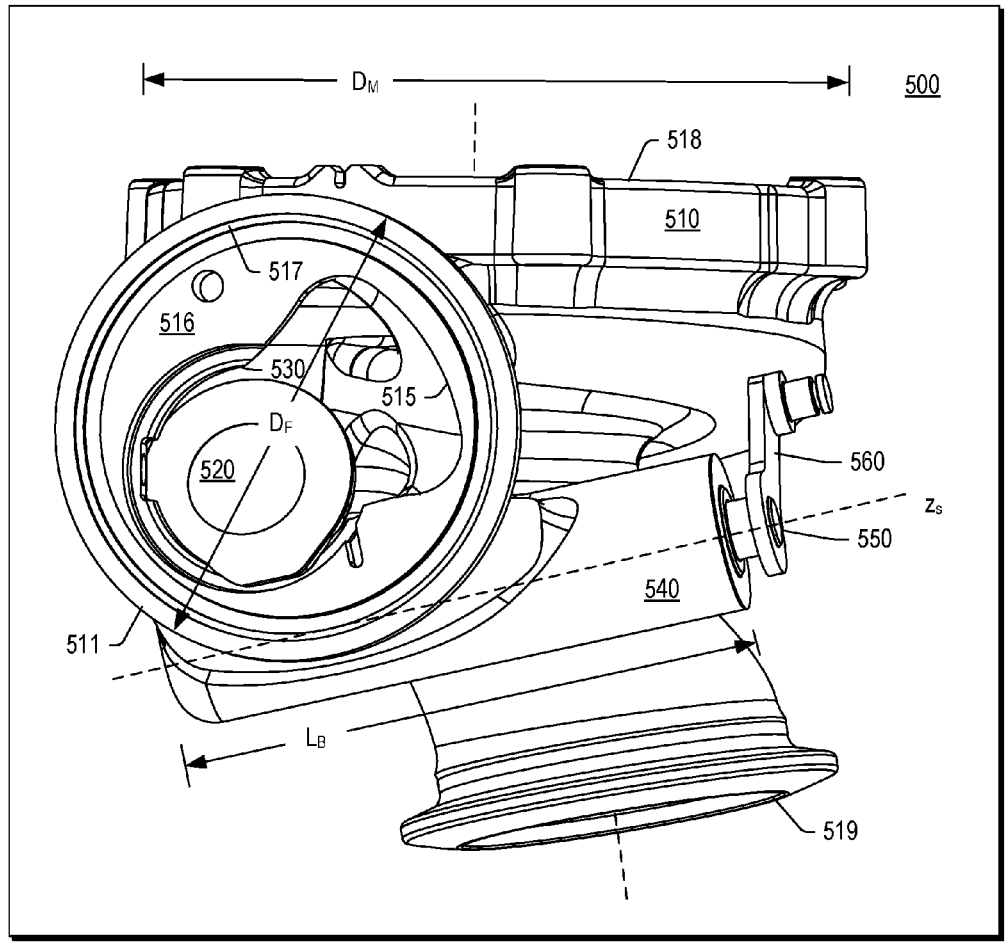
FIG. 5 is a perspective view of an example of an exhaust bypass valve assembly.
Figure 6:
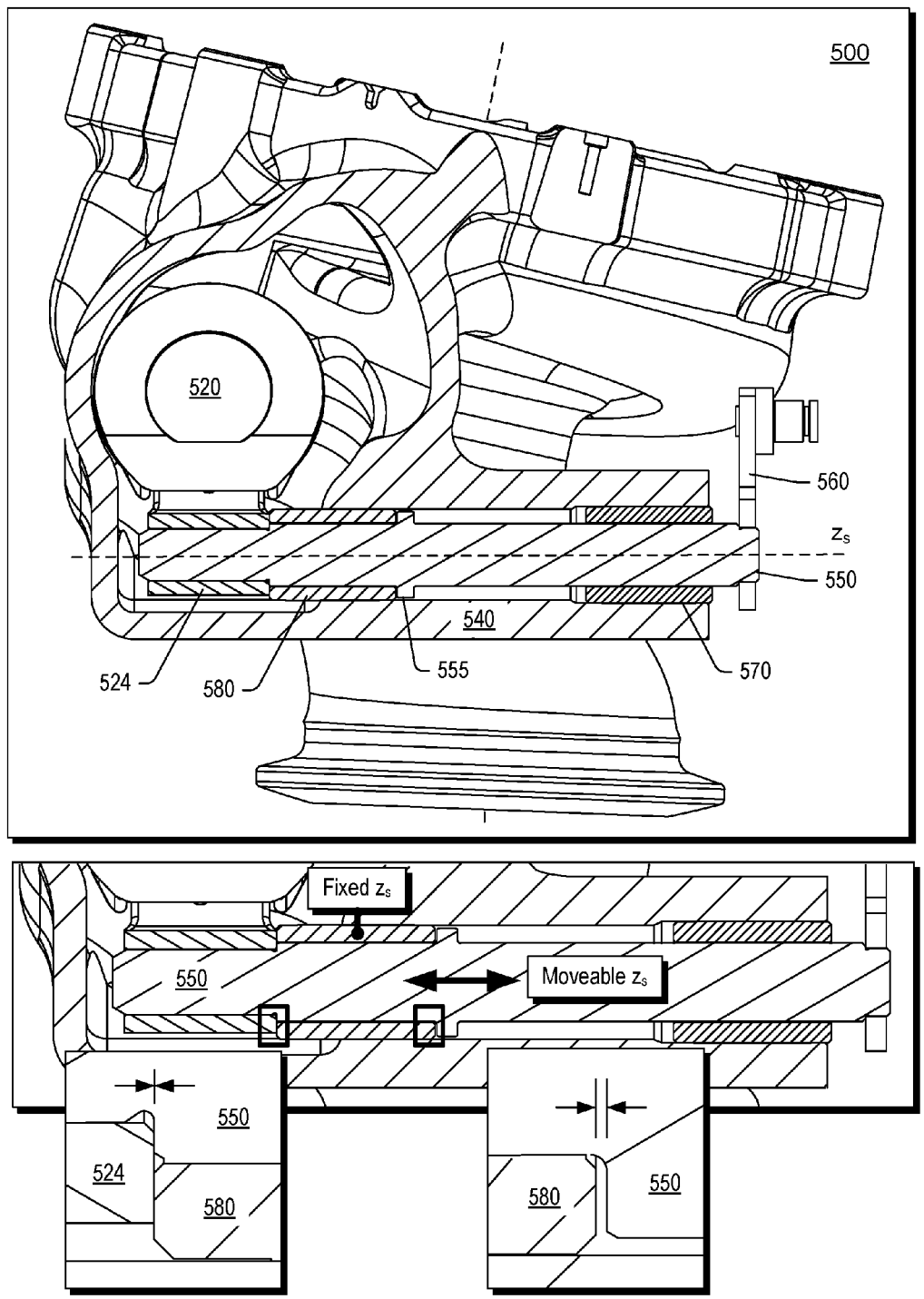
FIG. 6 is a cutaway view of an example of the assembly of FIG. 5.
Figure 7:
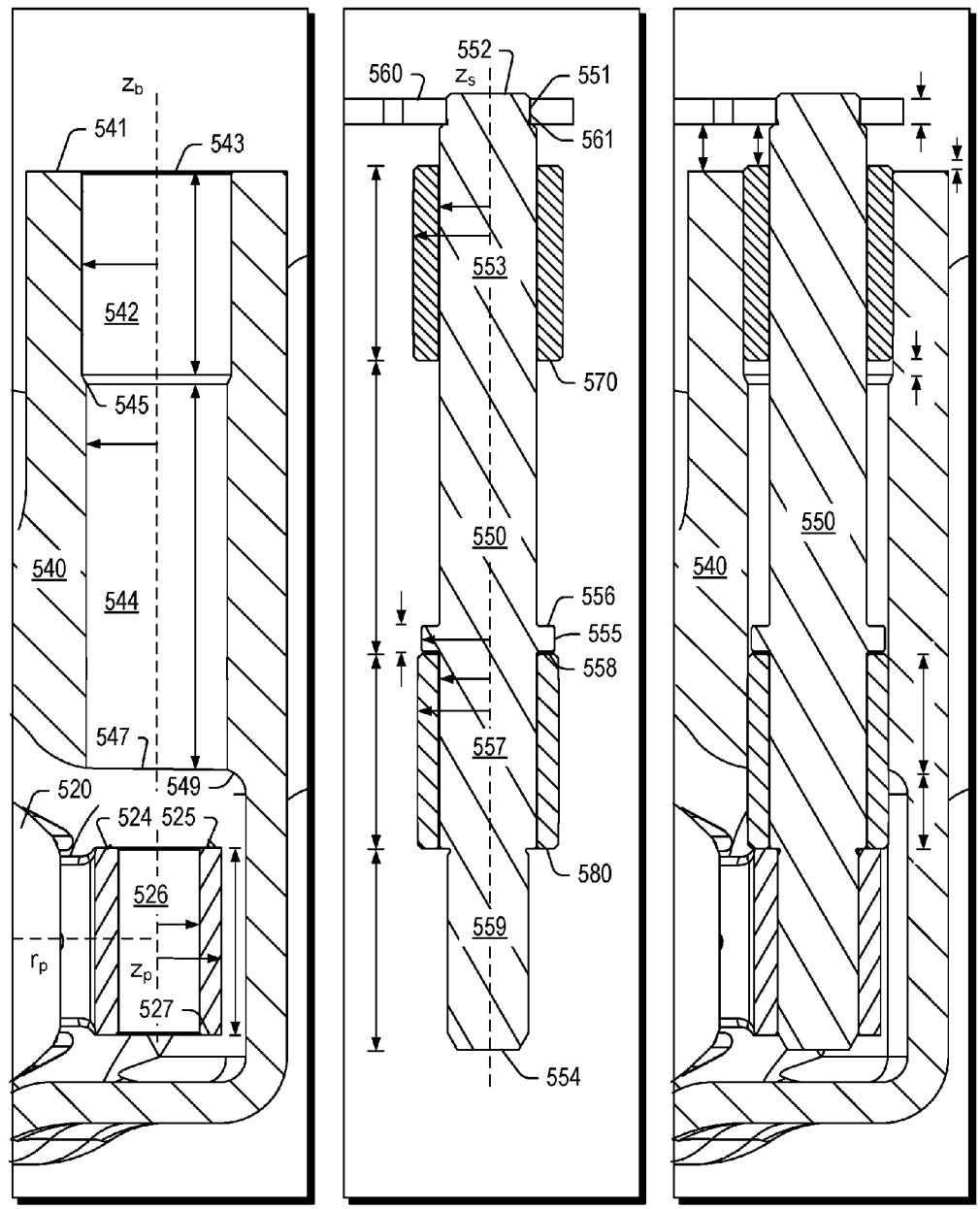
FIG. 7 is a series of views of an example of an assembly.
Figure 8:
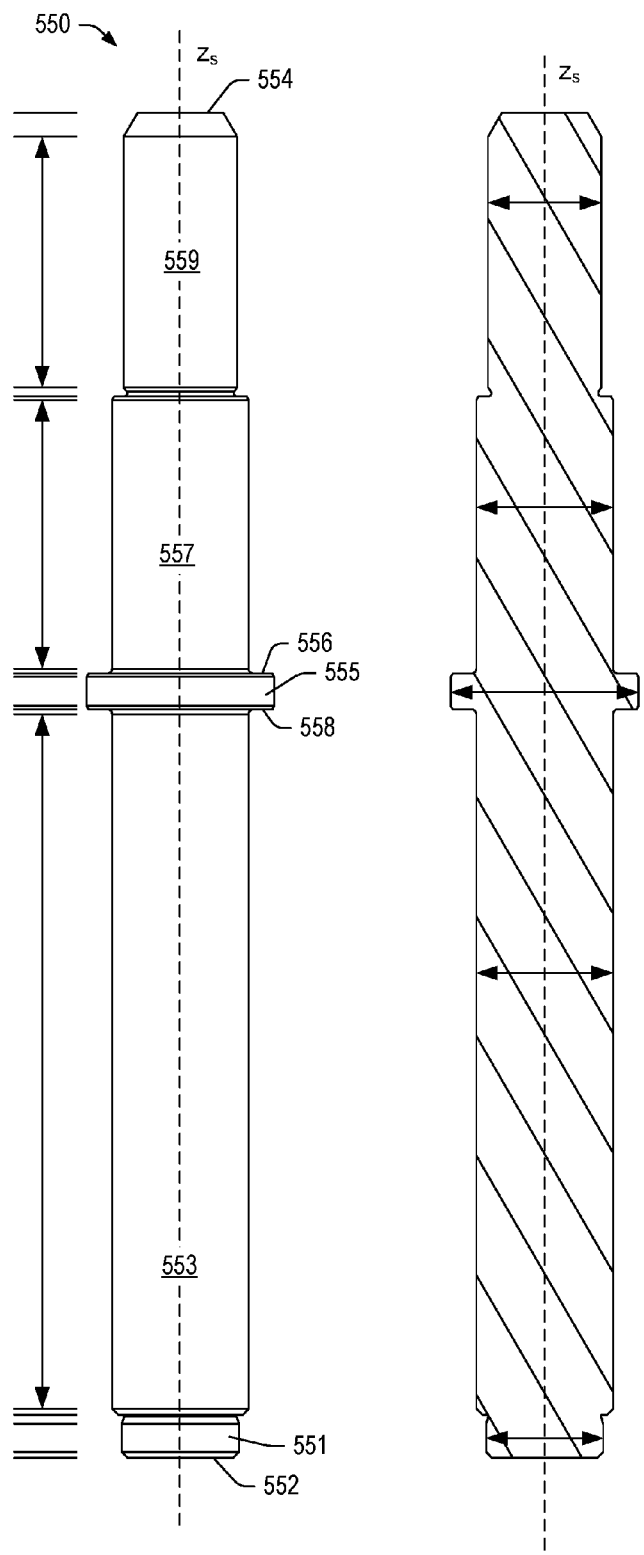
FIG. 8 is a series of views of an example of a valve shaft.

FIG. 5 shows a perspective view of an assembly 500 that includes a housing 510, a valve 520, a valve seat 530, a boss 540, a valve shaft 550, and a crank arm 560, where the valve shaft 550 has a valve shaft axis $z_s$ (see also FIGS. 7, 6 and 8). In the example of FIG. 5, the housing 510 includes an exhaust inlet flange 511 configured for connection to another component for receipt of exhaust and a housing flange 518 for operatively coupling the housing 510 to, for example, a center housing of a turbocharger. As shown in the example of FIG. 5, the housing flange 518 includes an opening for receipt of a turbine (e.g., a turbine wheel) where, for example, exhaust entering via the exhaust inlet flange 511 may flow to a volute defined by the housing 510 to be directed to the turbine (e.g., and then axially outwardly from the turbine to an exhaust outlet 519 of the housing 510).

In the example of FIG. 5, the housing 510 includes a face 516 defined in part by a face border 517 where an edge 515 that defines an opening for flow of exhaust (e.g., from an outlet of a high pressure turbine). In the example assembly 500 of FIG. 5, a gasket can be seated on the valve seat 530, which is received by housing 510. As an example, a joint can be formed between the housing 510 and another component via the exhaust inlet flange 511. As an example, the joint may be formed upon application of clamping force (e.g., by joining two components with a gasket or gaskets therebetween).

In the example of FIG. 5, the boss 540 includes a bore where the valve shaft 550 is seated at least in part in the bore. The valve shaft 550 is shown as being operatively coupled to the crank arm 560. The valve shaft 550 is also operatively coupled to the valve 520 such that rotation of the valve shaft 550 causes the valve 520 to move, for example, from an open state to a closed state and vice versa. In the closed state, the valve 520 is seated against the valve seat 530 such that a passage to the volute defined by the housing 510 is substantially sealed (e.g., closed). As to an open state, it can be a state in which exhaust is to flow such as a partially open state and a fully open state.

As the valve 520 is disposed in an exhaust environment or exhaust environments (e.g., on both sides), exhaust may leak out of the housing 510 via the bore of the boss 540. For example, where exhaust pressure exceeds ambient pressure, exhaust may pass through one or more clearances within the bore of the boss 540 and exit the housing 510 at an opening of the bore at the crank arm 560 end of the bore. Such leakage can be detrimental to one or more of performance, emissions, valve control, etc.

As shown in the example of FIG. 5, the valve shaft 550 is relatively long, which can affect clearances due to expansion and contraction as temperatures vary (e.g., consider exhaust temperature variations, ambient temperature variations, etc.). For example, FIG. 5 shows various dimensions including an approximate boss length $L_B$ of the boss 540, an approximate flange diameter $D_F$ of the flange 511 and an approximate mount diameter $D_M$ of the housing flange 518. In the example of FIG. 5, the valve shaft 550 extends a distance along the boss 540, which is approximately an entire length of the boss 540. Length of a boss 540 and a shaft 550 can depend on one or more factors such as, for example, packaging constraints of a two stage turbocharging system (e.g., as disposed in an engine compartment). As mentioned, axial movement of a component within an axial clearance or clearances may cause wear where, for example, the larger the axial clearance or clearances, the greater the risk of wear.

To address issues such as wear and friction, a bushing can be disposed in a bore where the bushing supports a valve shaft within the bore. Such a bushing can be made of a suitable material that can withstand exhaust temperatures. As an example, a bushing material can be a sintered material, which may be relatively expensive (e.g., considering the bushing as a component of an entire two stage turbocharging system). As an example, a bushing may be interference fit at least in part into a bore to thereby fix the bushing with respect to operational forces that the bushing may experience. As an example, a pin may be used that is received by a feature of a bushing (e.g., an annular groove, etc.) such that the bushing is axially located (e.g., fixed axially with respect to the bore).

As an example, a bushing may be relatively long. For example, consider a bushing that has a length that is at least about 50 percent of a length of a valve shaft. As an example, consider a bushing that is about 60 mm in length (e.g., about 2.4 inches). Such a long bushing can present some challenges in manufacture and, for example, quality control.

As an example, a system can utilize a plurality of bushings where each of such bushings is shorter than a unitary long bushing. Due to stack-up, axial clearances may be enlarged where multiple bushings are used; however, as mentioned, larger axial clearances can increase wear. Wear in such a system can be considerable, for example, consider a bushing that can wear as much as about 5 mm. Given such a high level of wear, a long bushing may be considered as the practical solution.

As an example, a system can include two bushings disposed about a valve shaft where the valve shaft includes a step (e.g., a stepped shaft). In such an example, at least a portion of each of the bushings is disposed in a bore of a boss of a turbine housing. In such an example, an axial clearance or clearances may be achieved that are approximately the same as an axial clearance or clearances of a single unitary bushing implementation (e.g., a single long bushing). As an example, a valve shaft can include a step that acts to ensure an amount of axial play of an assembly with respect to a fixed inner bushing in a system that includes the inner bushing as well as an outer bushing. In such an example, an inner bushing can be a bushing that is disposed within a housing and an outer bushing can be a bushing that is at least in part disposed within the housing. For example, the outer bushing may be exposed to an ambient environment via an opening of a bore of a boss and may, for example, extend beyond an end of a bore of a boss such that an end and at least a portion of a substantially cylindrical surface of the outer bushing is exposed to the ambient environment.

As an example, an outer bushing can be utilized to maintain a desired amount of radial contact (e.g., centering in a bore, etc.). The axial position of an outer bushing may be selected based on one or more factors. As an example, an inner bushing and an outer bushing may perform one or more common functions and/or one or more different functions. As an example, an outer bushing may be implemented without external crimping, as may be found with long mono bushing systems (e.g., a system with a single unitary valve shaft bushing).

FIG. 6 shows a cutaway view of the assembly 500 of FIG. 5, an enlarged cutaway view of a portion of the assembly 500 and further enlarged views of axial stops that limit axial movement of the valve shaft 550. The axial stops define one or more clearances in which the valve shaft 550 may move, expand (e.g., thermally), move and expand, etc.

As mentioned, the valve shaft 550 can be relatively long, for example, approximately a diameter of a portion of a turbine housing, etc. (see, e.g., various dimensions of FIG. 5). As an example, a relatively long valve shaft may have a length of about 40 mm or more (e.g., about 1.5 inches or more). As an example, a relatively long valve shaft may be characterized by an aspect ratio such as a length to average diameter ratio. For example, consider a length that is about 6 times an average diameter (see, e.g., the example of FIG. 6 where the valve shaft 550 has a length that is approximately 10 times the average diameter).

FIG. 6 shows the valve 520 as including an arm 524 with a bore that receives a portion of the valve shaft 550. In the example of FIG. 6, the assembly 500 includes an outer bushing 570 and an inner bushing 580. As shown, the inner bushing 580 is disposed axially between an axial stop 555 of the valve shaft 550 and a portion of the arm 524 of the valve 520. As an example, the axial stop 555 of the valve shaft 550 can be a full diameter or can be one or more extensions that extend radially outwardly to a radius that is greater than an inner radius of a bore of the inner bushing 580.

As an example, the axial stop 555 may be a collar that is formed into a blank that becomes the valve shaft 550. For example, a lathe may be utilized to cut away material of the blank to form the axial stop 555 as an integral part of the valve shaft 550. As an example, a machining process may form one or more features of the valve shaft 550.

As to the arm 524 of the valve 520, it can be interference fit to the valve shaft 550. As an example, the arm 524 of the valve 520 can be welded or otherwise bonded to the valve shaft 550. As an example, the arm 524 may be bolted or otherwise coupled to the valve shaft 550. As an example, the arm 524 can be positioned on the valve shaft 550 and fixed to the valve shaft 550 at a particular axial position that determines a clearance or clearances as to the axially fixed inner bushing 580 and the axial stop 555 of the valve shaft 550 and as to the axially fixed inner bushing 580 and a surface of the arm 524 (e.g., an axial face of the arm 524 that acts as a second axial stop). As an example, an inner bushing may be axially located in a bore and receive a valve shaft between a portion of an arm of a valve and an axial stop of the valve shaft.

As shown in the enlarged view of FIG. 6, the valve shaft 550 is limited in its axial movement due to the inner bushing 580 being fixed in at least a portion of the bore of the boss 540. At the left side, a surface of the arm 524, which is fixed to the valve shaft 550, acts as a stop surface with respect to an "inner" end surface of the inner bushing 580 and, at the right side, a surface of the axial stop 555 of the valve shaft 550 acts as a stop surface with respect to an "outer" end surface of the inner bushing 580. The clearance shown at the right side may be minimized as the valve shaft 550 translates to the left, during which transition, a clearance can open up at the left side. As an example, a clearance can exist at the left side and a clearance can exist at the right side. As an example, the overall clearance (e.g., axial distance) can define an amount of axial movement of the valve shaft 550 in the bore of the boss 540. Such an overall clearance may be selected to account for thermal effects (e.g., expansion and contraction of various components) and to account for wear (e.g., to minimize wear).

FIG. 7 shows various views of portions of the assembly 500 of FIG. 6. On the left, the boss 540 is shown as including an axial end surface 541 an outer bore 542, an opening 543 to the outer bore 542, an inner bore 544, a transition region 545 between the outer bore 542 and the inner bore 544, an inner opening 547 to the inner bore 544 and a surface 549 disposed about the inner opening 547.

As to the valve 520, in the example of FIG. 7, it includes an axial face 525, a bore 526, and another axial face 527. Various dimensions are illustrated in FIG. 7 with respect to the boss 540, which include radii and lengths; noting that a bore axis $z_b$ is shown as well as valve axes $z_p$ and $r_p$ (e.g., where the valve 520 rotates about the axis $z_p$).

In FIG. 7, in the center, the valve shaft 550 is shown with respect to the crank arm 560, the outer bushing 570 and the inner bushing 580. Various dimensions are illustrated with respect to a valve shaft axis $z_s$. As shown, the valve shaft 550 includes opposing ends 552 and 554, a crank arm coupling portion 551 (e.g., adjacent to a surface 561 of the crank arm 560), an outer bushing portion 553, the axial stop 555 and an inner bushing portion 557. As to the axial stop 555, it includes at least one axial face 558 that faces the end 554 and can include at least one axial face 556 that faces the end 552. In such an example, the at least one axial face 558 that faces the end 554 acts as a stop surface of the axial stop 555 of the valve shaft 550.

In FIG. 7, on the right, the sub-assembly as in the center view, is disposed in the boss 540 as in the left view. As an example, an assembly process can include positioning the valve 520, positioning at least the inner bushing 580 (e.g., fixing it at least in part in the bore of the boss) and inserting the valve shaft 550 into the bore of the boss 540 to engage the end portion 559 of the valve shaft 550 and the arm 524 of the valve 520.

As shown in FIG. 7, the inner bushing 580 can be partially within the inner bushing bore 544 of the boss 540 and, for example, partially within a chamber that is an exhaust chamber where the valve 520 operates (e.g., to open and close). As shown in FIG. 7, the outer bushing 570 can be partially within the outer bushing bore 542 and, for example, partially exposed by extending beyond the opening 543 of the boss 540. Various clearances are shown in FIG. 7 as to the crank arm 560 and the axial end surface 541 of the boss 540.

As an example, the valve shaft 550 can move within the boss 540 in an axial direction; however, the valve shaft 550 is limited in its axial movement due to the arm 524 of the valve 520 and the axial stop 555 of the valve shaft 550.

As an example, the valve shaft 550 can move within the boss 540 in an axial direction; however, the inner bushing 580, being axially fixed, limits the axial movement of the valve shaft 550 due to the arm 524 of the valve 520 and the axial stop 555 of the valve shaft 550.

FIG. 8 shows a side view of the valve shaft 550 and a cross-sectional view of the valve shaft 550 along with various dimensions.

Figure 9:
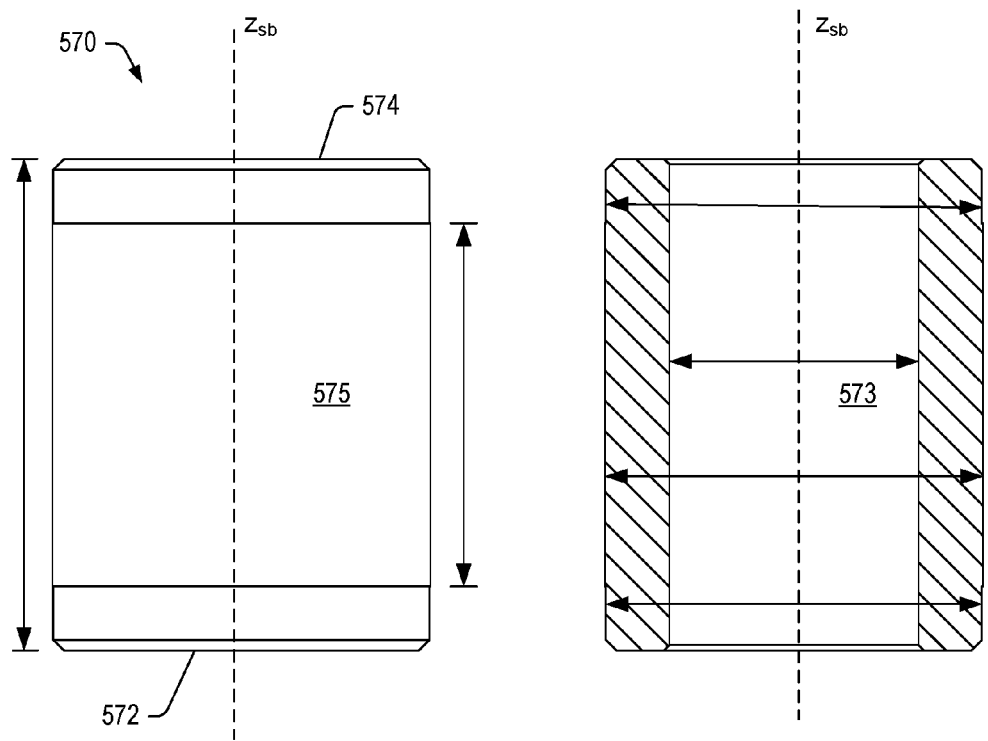
FIG. 9 is a series of views of an example of a bushing.

FIG. 9 shows a side view of the outer bushing 570 and a cross-sectional view of the outer bushing 570 along with various dimensions, including a bushing axis $z_{sb}$. As shown, the outer bushing 570 includes a bore 573 and an outer surface 575 as defined between opposing axial ends 572 and 574. As an example, the outer surface 575 of the bushing 570 can include one or more reduced diameter portions, for example, at an end or ends 572 and 574.

Figure 10:
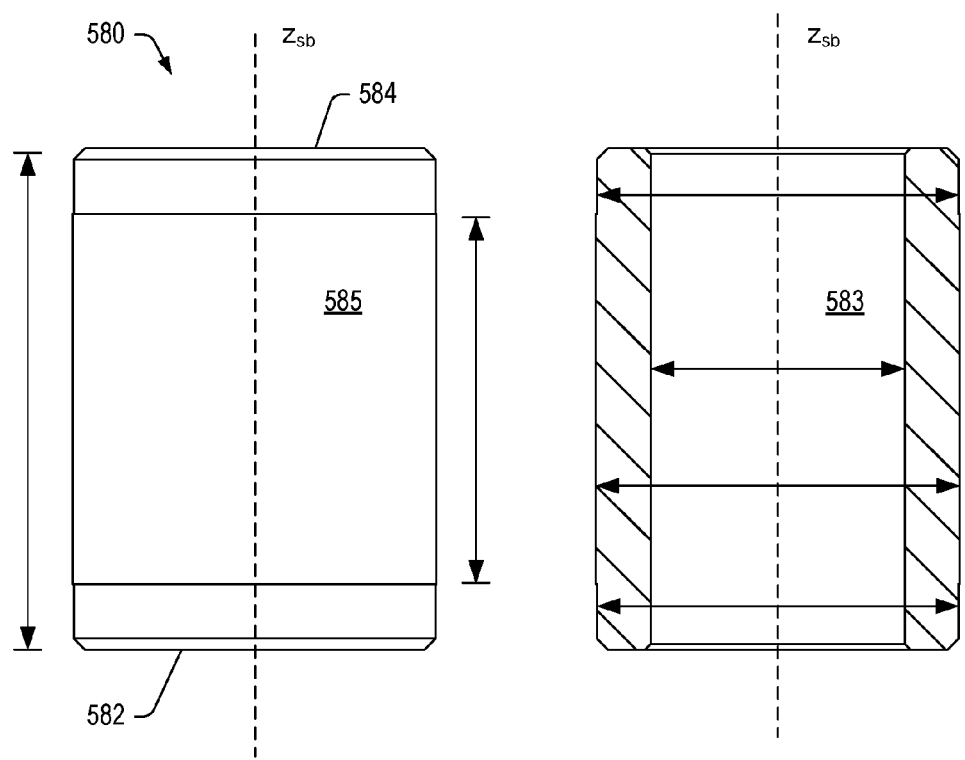
FIG. 10 is a series of views of an example of a bushing.

FIG. 10 shows a side view of the inner bushing 580 and a cross-sectional view of the inner bushing 580 along with various dimensions, including a bushing axis $z_{sb}$. As shown, the inner bushing 580 includes a bore 583 and an outer surface 585 as defined between opposing axial ends 582 and 584. As an example, the outer surface 585 of the bushing 580 can include one or more reduced diameter portions, for example, at an end or ends 582 and 584.

Figure 11:
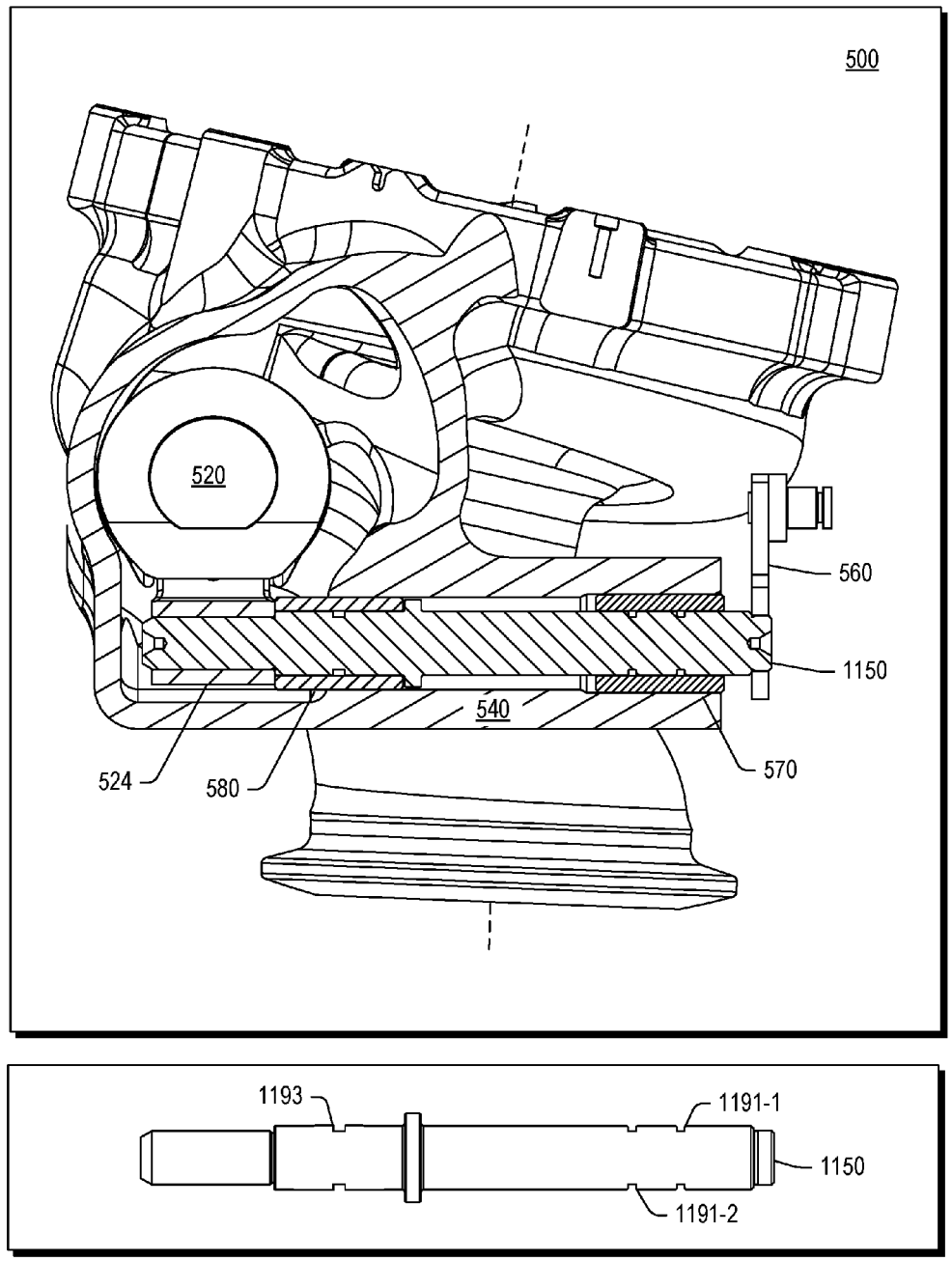
FIG. 11 is a cutaway view of an example of an assembly and a side view of an example of a valve shaft.

FIG. 11 shows a cutaway view of an example of the assembly 500 that includes a valve shaft 1150 rather than the valve shaft 550. As shown, the valve shaft 1150 can include one or more annular grooves 1191-1, 1191-2, and 1193 that can receive one or more seal rings. As shown, the annular grooves 1191-1 and 1191-2 are in the outer bushing portion of the valve shaft 1150 while the annular groove 1193 is in the inner bushing portion of the valve shaft 1150.

Figure 12:
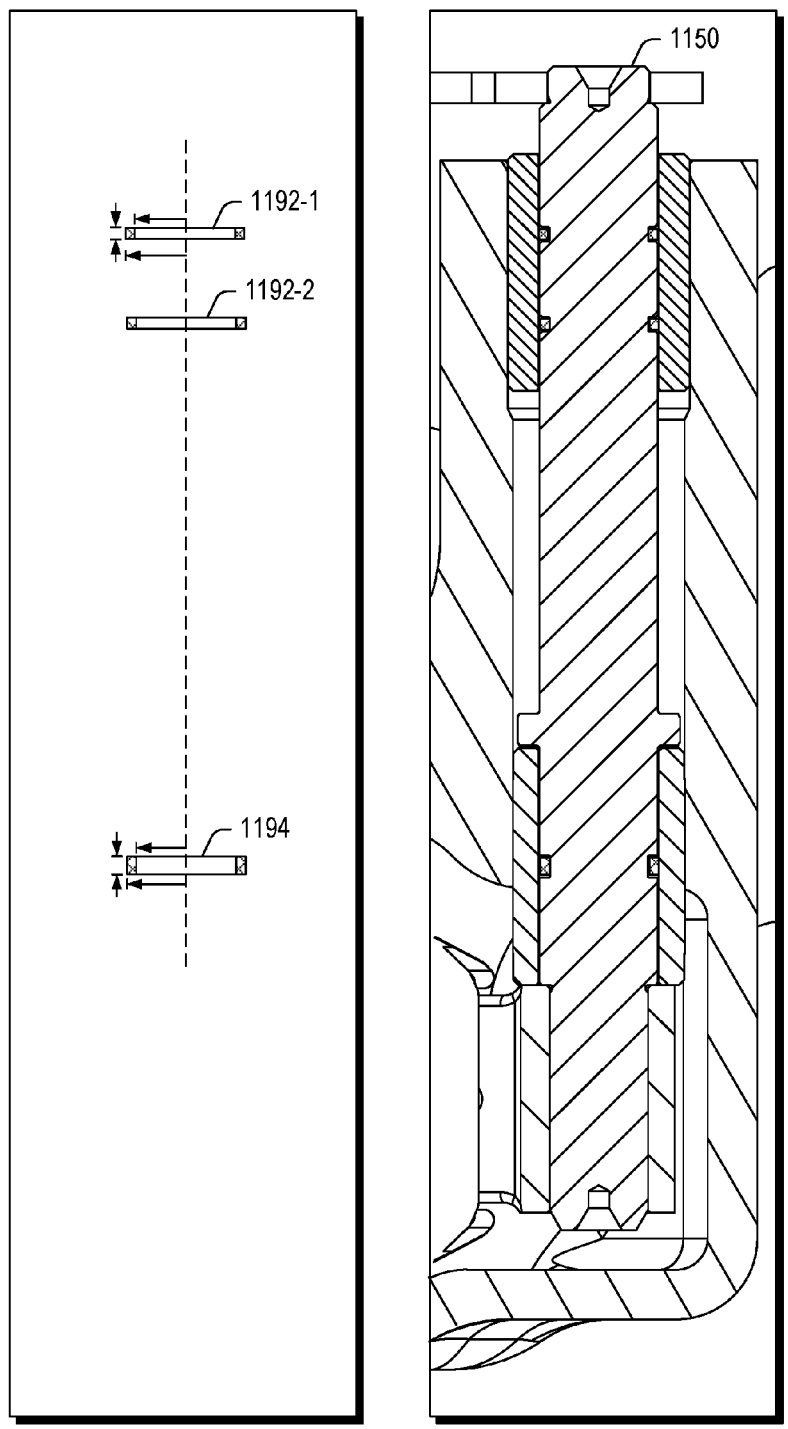
FIG. 12 is a series of views of examples of rings and an example of an assembly that can include the rings.

FIG. 12 shows seal rings 1192-1, 1192-2 and 1194 as may be disposed at least in part in the respective annular grooves 1191-1, 1191-2, and 1193. Such seal rings may provide obstacles to flow of exhaust from an inner environment associated with the valve outward through the bore of the boss to an ambient environment.

As an example, the seal ring 1194 may be an elastomeric material that is susceptible to degradation at operational temperatures (e.g., exhaust temperatures). For example, such a seal ring may be utilized for a quality control assessment (e.g., a pressurized air assessment) and then degrade once the assembly is installed and implemented for use with an internal combustion engine.

Figure 13:
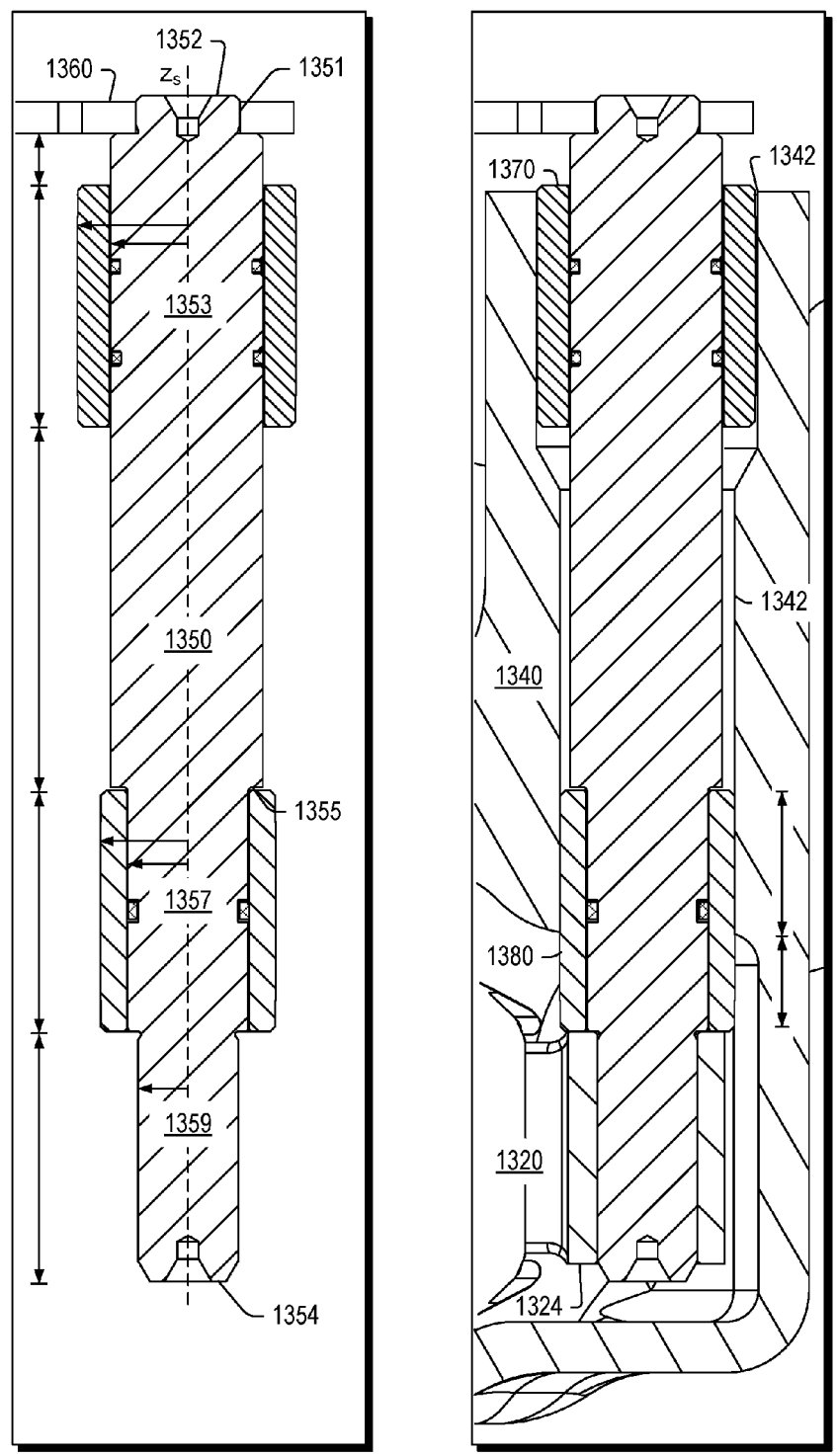
FIG. 13 is series of views of an example of an assembly that includes an example of a valve shaft.

FIG. 13 shows a cutaway view of a sub-assembly that includes an example valve shaft 1350 as disposed at least in part in a bore of a boss 1340. In the example of FIG. 13, the valve shaft 1350 includes opposing ends 1352 and 1354, a crank arm coupling portion 1351 for a crank arm 1360, an outer bushing portion 1353, an inner bushing portion 1357 and an arm portion 1359 for an arm of a valve. As shown, the valve shaft 1350 includes an axial stop 1355 that is formed by a stepped diameter (e.g., a transition region between a larger diameter portion and a smaller diameter portion of the valve shaft 1350). The axial stop 1355 can be an annular axial face. As shown, the larger diameter portion of the valve shaft 1350 extends outwardly toward the end 1352 and the bore 1342 of the boss 1340 also transitions from a smaller diameter to a larger diameter, for example, to accommodate an outer bushing 1370 about the valve shaft 1350. As shown, an inner bushing 1380 can be axially located (e.g., axially fixed) between the axial stop 1355 and a portion of an arm 1324 of a valve 1320 such that an overall axial clearance is defined for movement of the valve shaft 1350.

As an example, the axial stop 1355 may be a part of a step that is formed into a blank that becomes the valve shaft 1350. For example, a lathe may be utilized to cut away material of the blank to form the axial stop 1355 as an integral part of the valve shaft 1350. As an example, a machining process may form one or more features of the valve shaft 1350.

Figure 14:
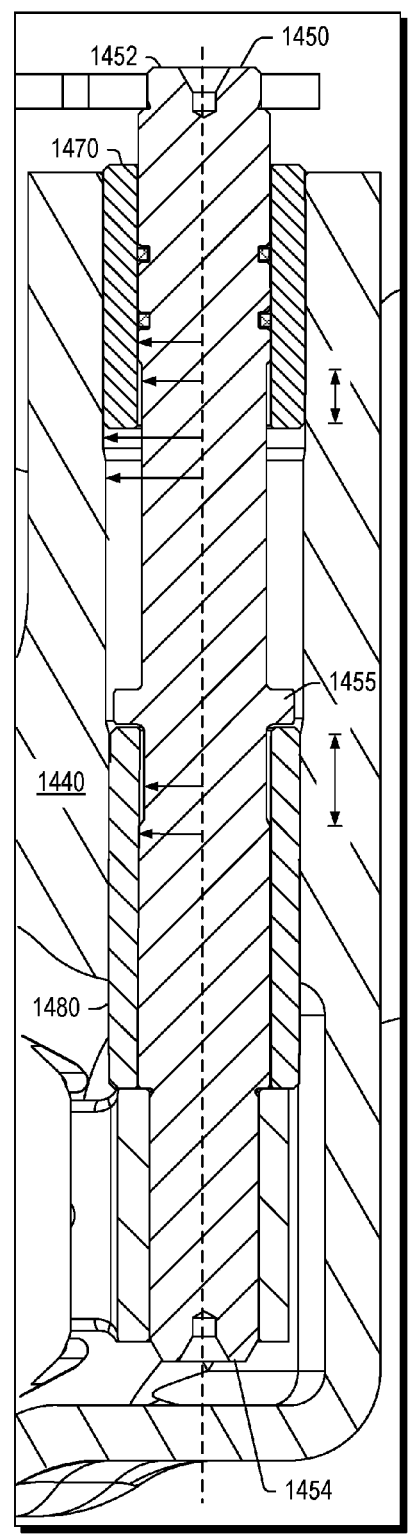
FIG. 14 is cutaway view of an example of an assembly.

FIG. 14 shows a cutaway view of a sub-assembly that includes an example valve shaft 1450 with respect to a boss 1440. In the example of FIG. 14, the valve shaft 1450 includes a reduced diameter portion between an end 1454 and an axial stop 1455 and a reduced diameter portion between an end 1452 and the axial stop 1455. As shown, the outer bushing 1470 may form a clearance with respect to the reduced diameter portion and the inner bushing 1480 may form a clearance with respect to the reduced diameter portion. As an example, such portions may provide for "shortening" a contact length (e.g., or contact area) of the outer bushing 1470 and the valve shaft 1450 and the inner bushing 1480 and the valve shaft 1450.

Figure 15:
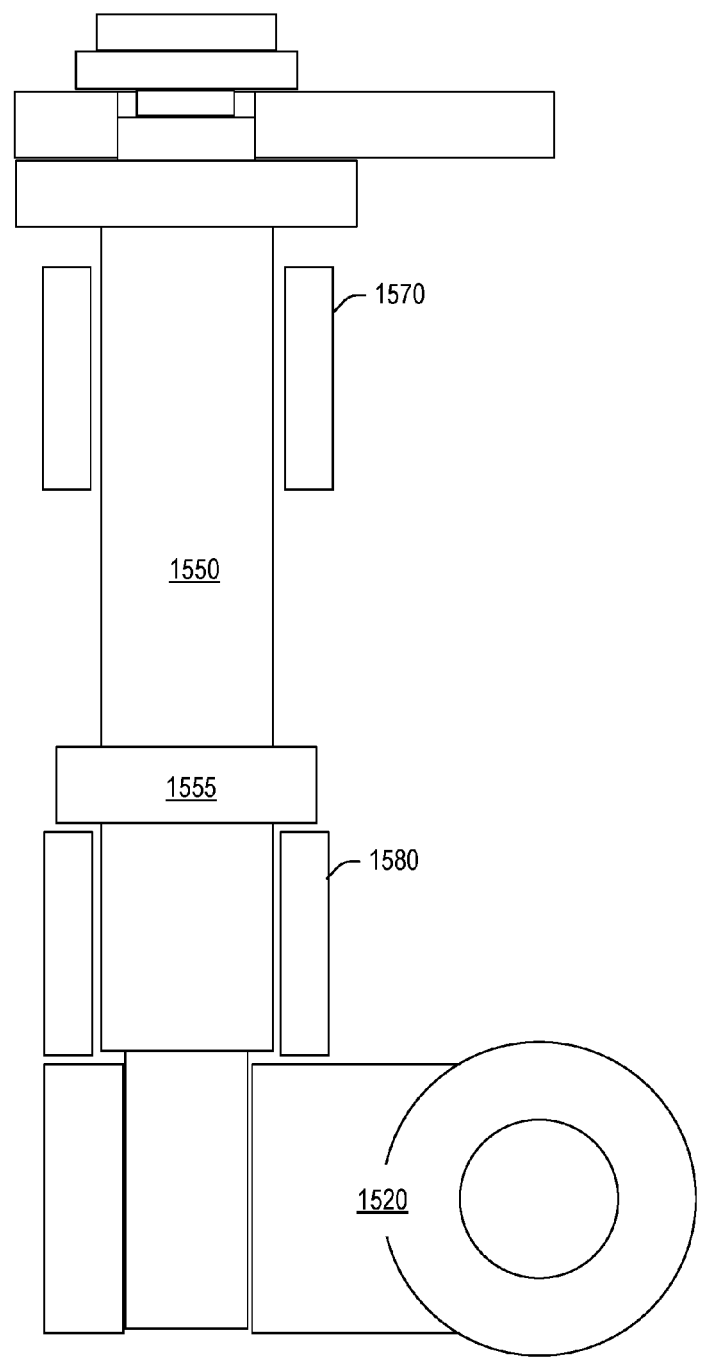
FIG. 15 is an approximate view of an example of a sub-assembly.

FIG. 15 shows an approximated view of a sub-assembly that includes a plurality of bushings 1570 and 1580 disposed about a valve shaft 1550 that controls a valve 1520 where one of the bushings 1580 is axially located in an axial span defined by an axial stop 1555 of the valve shaft 1550 and a portion of the valve 1520. In such an example, the diameters of the bushings 1570 and 1580 may be approximately the same.

Figure 16:
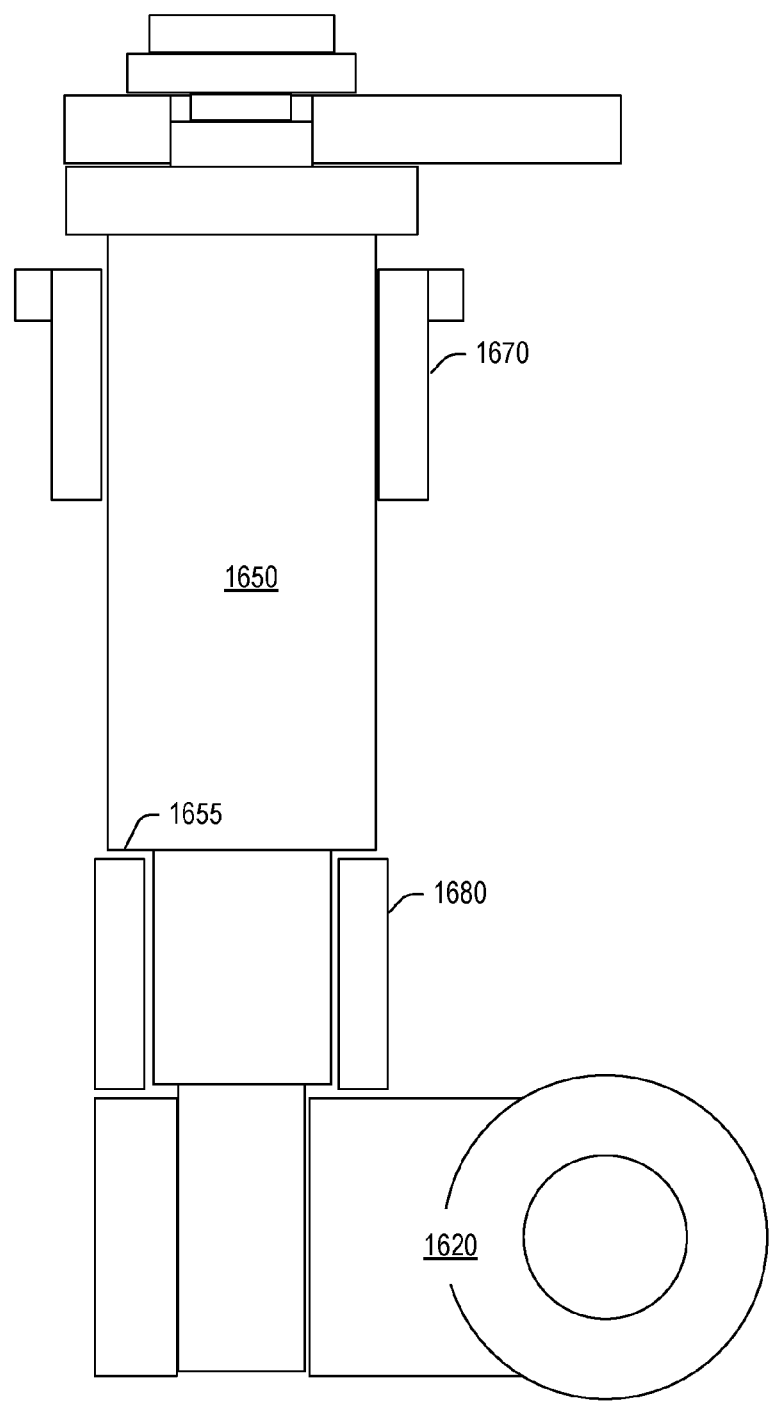
FIG. 16 is an approximate view of an example of a sub-assembly.

FIG. 16 shows an approximated view of a sub-assembly that includes a plurality of bushings 1670 and 1680 disposed about a valve shaft 1650 that controls a valve 1620 where one of the bushings 1680 is axially located in an axial span defined by an axial stop 1655 of the valve shaft 1650 and a portion of the valve 1620. In such an example, the diameters of the bushings differ where an outer bushing is larger in diameter than an inner bushing.

As an example, the valve shaft 1650 of FIG. 16 may be referred to as a full sleeve valve shaft, which can utilize a larger outer bushing ID (e.g., larger than the inner bushing ID). In such an approach, the outer bushing and the inner bushing may be interference fit in the bore of a boss. Then, the valve shaft may be inserted. As shown, the approach of FIG. 16 can use a valve shaft that has a larger diameter and hence mass (e.g., thermal mass, etc.) when compared to an approach such as that of FIG. 15 where the axial stop 1555 is of a limited axial length (e.g., a "collar" that is shorter axially than the "full sleeve" portion of the valve shaft 1650). In the example of FIG. 16, such an approach can allow for a larger valve shaft diameter to support a crank, for example, which may allow for a bolted crank.

As an example, the collar approach to a valve shaft as in the example of FIG. 15, can allow for use of an outer bushing that is approximately of the same bushing dimensions as the inner bushing. In such an example, for assembly, the inner bushing can be interference fit into the bore (e.g., to axially fix the inner bushing) and then the outer bushing, optionally at the same time as the valve shaft (e.g., with or without the valve shaft). As the valve shaft in the example of FIG. 15 may have a smaller diameter at the outer end, it may not be as amenable to a bolted crank (e.g., bolted crank arm) as the "sleeve" approach of FIG. 16.

As an example, where a crank arm is to be bolted to a valve shaft, a "full sleeve" approach may be utilized that can provide for a larger diameter outer end of a valve shaft when compared to a "collar" approach.

Figure 17:
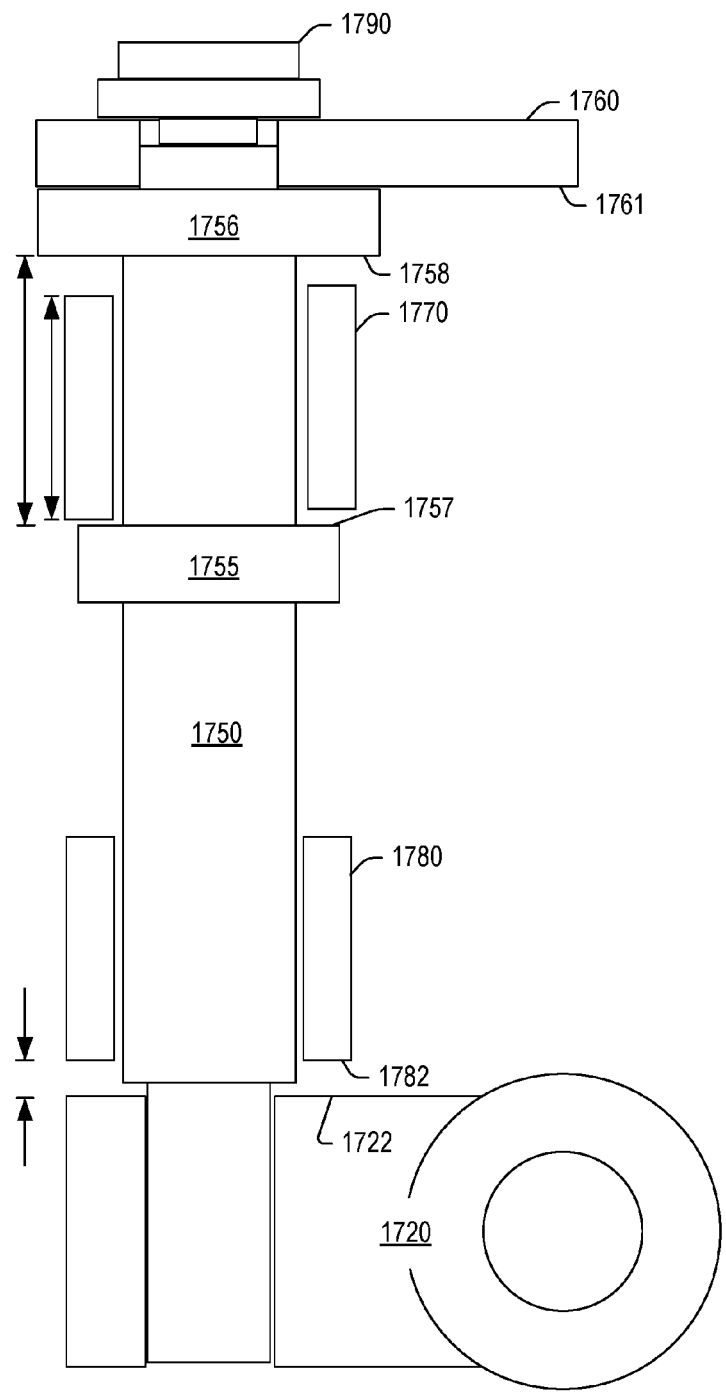
FIG. 17 is an approximate view of an example of a sub-assembly.

FIG. 17 shows an approximate view of a sub-assembly that includes a plurality of bushings 1770 and 1780 disposed about a valve shaft 1750 that controls a valve 1720 where one of the bushings 1770 is axially located in an axial span defined by an axial stop 1755 of the valve shaft 1750 and a collar 1756, which can be a portion of a fixture that can support a crank arm 1760. In such an example, the diameters of the bushings 1770 and 1780 may be approximately the same.

As shown in the example of FIG. 17, the axial stop 1755 includes a surface 1757 that faces the bushing 1770 (e.g., an end of the bushing 1770) and the collar 1756 includes a surface 1758 that faces the bushing 1770 (e.g., an end of the bushing 1770). In such an example, a clearance may be defined as an axial distance between the surface 1757 and the surface 1758. As an example, a clearance may be defined between a surface 1722 of the valve 1720 and a surface 1782 of the bushing 1780 where, for example, axial movement of the valve shaft 1750 is limited by the clearance with respect to the bushing 1770 where the bushing 1770 is axially fixed via one or more of an interference fit, a pin, etc. As an example, in an instance that the bushing 1770 becomes "unfixed" and moves axially (e.g., due to wear, force, temperature, etc.), the bushing 1780 may limit axial movement (e.g., as a back-up mechanism) in at least an outward direction, upwardly in the example of FIG. 17.

As an example, the collar 1756 may be adjustable to define a clearance (e.g., with respect to an axial length of the bushing 1770). As an example, one or more adjustments may be made after operation of the sub-assembly in a turbocharger system. As an example, the collar 1756 may be fit to the valve shaft 1750 and may include a surface or one or more other features for supporting the crank arm 1760. As an example, a component 1790 may be attached to at least in part secure the crank arm 1760 and/or the collar 1756. As an example, the component 1790 may be a threaded bolt and the valve shaft 1750 may include threads that mate with at least a portion of the threads of the threaded bolt. As an example, one or more other types of mating components may be utilized where, for example, one of the components is positionable to form a stop surface such as the surface 1758.

Figure 18:
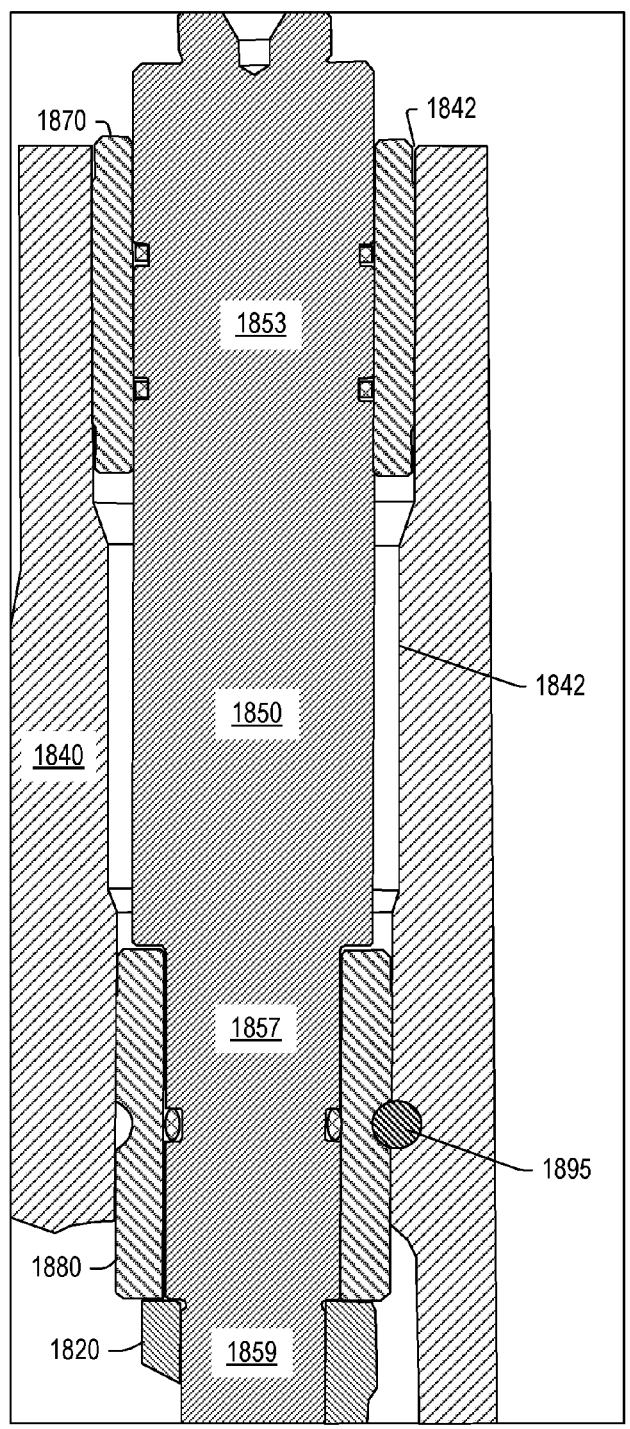
FIG. 18 is a cutaway view of an example of an assembly.

FIG. 18 shows a cutaway view of a sub-assembly that includes an example valve shaft 1850 as disposed at least in part in a bore of a boss 1840 along with an outer bushing 1870 and an inner bushing 1880 where the boss 1840 includes a bore 1842. In the example of FIG. 18, the valve shaft 1850 includes opposing ends and a crank arm coupling portion for a crank arm, an outer bushing portion 1853, an inner bushing portion 1857 and an arm portion 1859 for an arm of a valve 1820. As shown, the valve shaft 1850 includes an axial stop that is formed by a stepped diameter (e.g., a transition region between a larger diameter portion and a smaller diameter portion of the valve shaft 1850).

As shown, the inner bushing 1880 can be axially located between the axial stop and a portion of an arm of a valve 1820. In the example of FIG. 18, the inner bushing 1880 includes an annular groove that can receive a pin 1895 that is inserted into a cross-bore of the boss 1840. In such an example, the inner bushing 1880 may be rotatable but limited in its axial movement by the pin being seated in part in the cross-bore of the boss 1840 and being seated in part in the annular groove of the inner bushing 1880. In such a manner, the inner bushing 1880 can be axially fixed.

Figure 19:
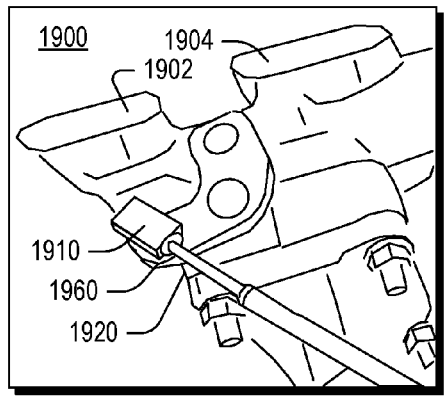
FIG. 19 is a series of views of an example of an assembly.
Figure 19:
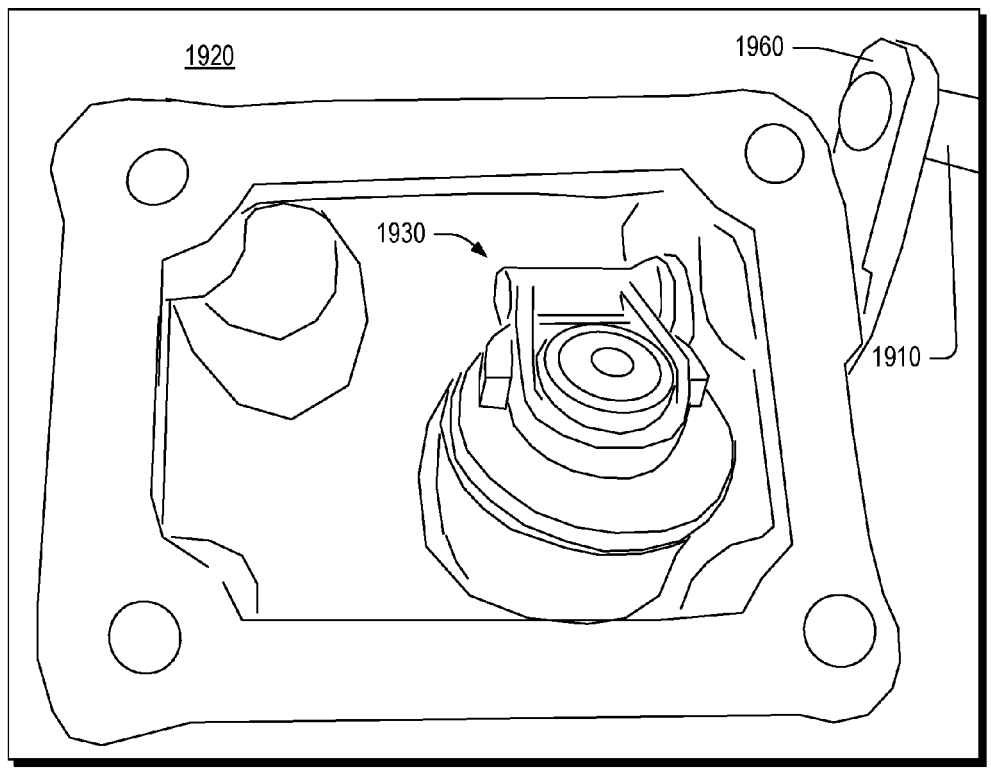

FIG. 19 is a series of views of an example of an assembly 1900 that includes exhaust inlets 1902 and 1904 and a control linkage 1910 that is operatively coupled to a crank arm 1960 to operate a bypass mechanism 1920. The bypass mechanism 1920 is shown with a portion of the assembly 1900 removed to reveal a chamber that includes an exhaust valve 1930 that is operatively coupled to the crank arm 1960 and the control linkage 1910. In such an example, the exhaust valve 1930 can include a shaft that is disposed in a bore defined by a portion of a body or housing of the bypass mechanism 1920. In such an example, a plurality of bushings can be disposed at least in part in the bore and the shaft can include an axial stop that acts to axially limit movement of at least one of the bushing. In such an example, a portion of the exhaust valve 1930 may form an axial stop and/or a portion of the crank arm 1960 (e.g., or mechanism associated with the crank arm 1960) may form an axial stop.

Figure 20:
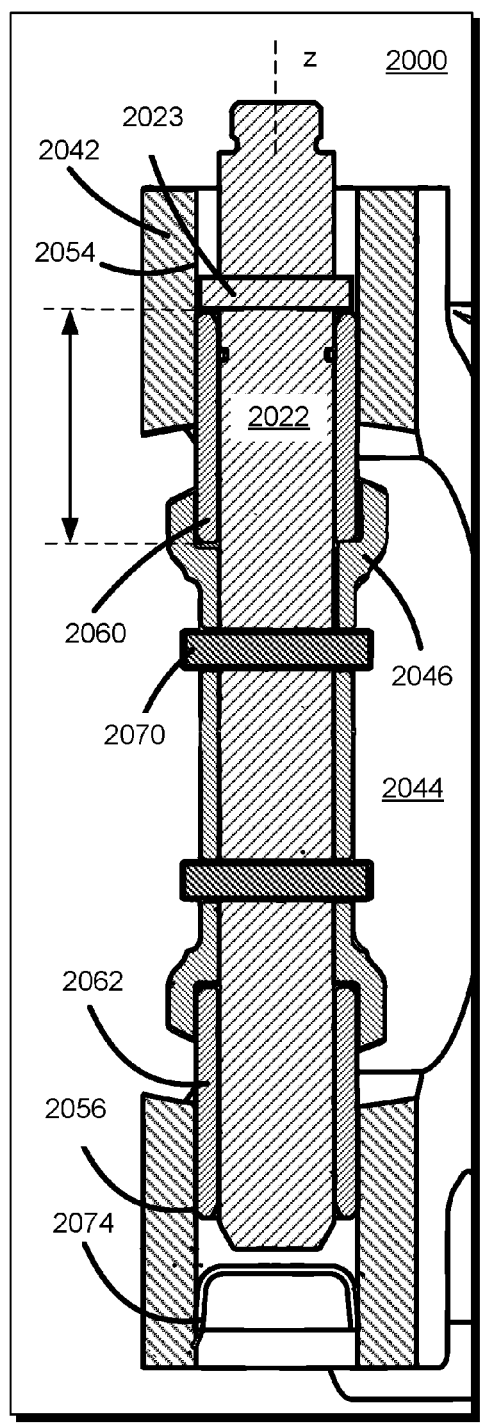
FIG. 20 is a cutaway view of an example of a shaft in an example of an assembly.

FIG. 20 shows an example of an assembly 2000 suitable for use in a series sequential turbocharger system that can include a low pressure turbocharger that includes a low pressure compressor and a low pressure turbine and a high pressure turbocharger that includes a high pressure compressor and a high pressure turbine. For example, the assembly 2000 can be utilized as a portion of a bypass valve (e.g., a turbine bypass valve).

As shown in FIG. 20, the assembly 2000 includes a butterfly valve element 2046 located within a housing 2042. As shown in FIG. 20, the butterfly valve element 2046 has a shaft 2022 extending from a side thereof to which an arm may be affixed that acts as a lever arm for rotating the shaft 2022, and the shaft 2022 is affixed to the butterfly valve element 2046 inside the assembly 2000.

As shown in the example of FIG. 20, the housing 2042 includes a valve passageway 2044. The butterfly valve element 2046 that is positioned in the passageway 2044 can be substantially circular and can be rotated about an axis of the shaft 2022 so that it is either substantially blocking the passageway 2044, or allowing passage of gas through the passageway 2044 in varying amounts. When it is fully open, the butterfly valve element 2046 is at oriented in a plane that is substantially perpendicular to the plane in which it lies, which is the closed position, so that when open substantially its thickness dimension is presented to the flow of gas (e.g., exhaust gas) in the passageway 2044. As such, flow of gas can pass the butterfly valve element 2046 on both sides of it and since the shaft 2022 is substantially in the middle of the butterfly valve element 2046, it may be generally balanced by the stream of gas.

When the butterfly valve element 2046 is closed, it can seat against lap seating surfaces that are formed in the passageway 2044 on the housing 2042 on opposite sides of the passageway 2044 and facing opposite ends of the butterfly valve element 2046. The axis about which the butterfly valve element 2046 is turned is between the two lap seating surfaces and is the axis of shaft 2022.

As shown in the example of FIG. 20, the shaft 2022 extends into bores 2054 and 2056 on opposite sides of the passageway 2044, which are also aligned along the shaft axis. Bushings 2060 and 2062 are pressed into the respective bores 2054 and 2056, for example, such that they are substantially limited in rotation relative to the housing 2042 and are substantially fixed along the axis relative thereto. The bushings 2060 and 2062 journal the shaft 2022 and also extend into butterfly counter bores that are formed in opposite ends of the bore through the butterfly valve element 2046 through which the shaft 2022 extends.

In the example of FIG. 20, pins 2070 are included, which act to keep the butterfly valve element 2046 from turning too much relative to the shaft 2022. The pins 2070 can be, for example, pressed into holes in the shaft 2022. Holes in the butterfly valve element 2046 through which the pins 2070 can extend may be slightly larger than the pins 2070 so they do not form a fixed connection with the butterfly valve element 2046, so as to permit it some freedom of relative movement. In such an example, the butterfly valve element 2046 can, to a limited extent, turn slightly relative to the shaft 2022, and move along the axis relative to the shaft 2022, for example, as limited by the pins 2070 and the other fits.

In the example of FIG. 20, a cap 2074 is shown as being, for example, pressed into the bore 2056, to close off the corresponding end. The shaft 2022 can extend from the opposite end, out of bore 2054, for example, so that it can be coupled to an actuator such as, for example, the actuator 2026.

As an example, a seal pack can be provided between the shaft 2022 and the bore 2054 to inhibit leakage into or out and, for example, a backer ring may be pressed into the bore 2054 to hold in the seal pack.

In the example of FIG. 20, the shaft 2022 includes a collar 2023. In such an example, the collar 2023 can limit axial movement of the shaft 2022 in the bore 2054. For example, where the bushing 2060 is substantially fixed axially in the bore 2054 (e.g., via interference fit, etc.), the collar 2023 can act as an axial stop with respect to an end surface of the bushing 2060. As an example, the butterfly valve element 2046 can include an end that limits axial movement of the shaft 2022, for example, via contact with another, opposing end of the bushing 2060 such that a portion of the butterfly valve element 2046 acts as an axial stop. In such an example, axial movement of the shaft 2022 may be limited by one or more axial stops.

As an example, a surface of a portion of the valve element 2046 and a surface of the collar 2023 can define an axial distance that is greater than an axial length of the bushing 2060. In such an example, the shaft 2022 may move axially within the clearance defined by the axial distance and the shorter axial length of the bushing 2060. Such a clearance may be at one end, an opposing end or distributed at both ends of the bushing 2060 (e.g., at various times during operation of the assembly 2000).

As an example, a butterfly valve element can be positioned axially (e.g., sandwiched) between two bushings (e.g., left and right bushings) that can act as axial stops. In such an example, a clearance or clearances tend to be relatively small, for example, to reduce leakage. However, some amount of play can be present to help to reduce sticking (e.g., due to thermal effects, etc.).

As an example, where an assembly includes multiple bushings, the materials of construction and/or treatments applied to such materials, may optionally differ. For example, the inner bushing may be more durable as it is exposed generally to higher temperatures than the outer bushing (e.g., due to proximity to/contact with an ambient environment).

As an example, a multi-bushing approach may act to reduce effects of distortions as may be associated with a single unitary bushing approach (e.g., a single long bushing).

As an example, a valve shaft that includes an axial stop can increase tortuosity of a flow path that exhaust gas may travel from one region to another region. For example, where an exhaust gas pressure is higher than an ambient air pressure, the pressure differential can be a driving force for flow of the exhaust gas via a bore that receives a valve shaft. Where such a valve shaft includes at least one stepped portion with an axial face that can act as an axial stop, the tortuosity of an exhaust flow path (e.g., passage) may be increased, which may act to reduce an amount of exhaust gas leakage.

As an example, where an axial stop surface of a valve shaft abuts (e.g., contacts) an end of a bushing, the axial stop surface can have a diameter that exceeds a bore diameter of a bore of the bushing such that the axial stop surface acts to close off an annular clearance between a portion of the valve shaft disposed in the bore of the bushing and an inner surface of the bushing that defines the bore of the bushing.

As an example, an assembly for an exhaust bypass valve of a two-stage turbocharger can include a first turbocharger stage and a second turbocharger stage where one of the stages includes a boss that includes a bore; an exhaust bypass valve that includes an arm pivotable to orient the exhaust bypass valve in an open state and a closed state; a valve shaft disposed at least in part in the bore and operatively coupled to the exhaust bypass valve where the valve shaft includes an inner end, an outer end and an axial stop disposed between the inner end and the outer end; an outer bushing disposed at least in part in the bore and located axially along the valve shaft; and an inner bushing axially fixed at least in part in the bore and located axially along the valve shaft between a portion of the arm of the exhaust bypass valve and the axial stop of the valve shaft. In such an example, one end of the inner bushing and the axial stop of the valve shaft and an opposing end of the inner bushing and a portion of the arm of the exhaust bypass valve can define an overall axial clearance that limits axial movement of the valve shaft in the bore.

As an example, an arm of an exhaust bypass valve can be fixed to a valve shaft to define an axial span between a portion of the arm and an axial stop, for example, where the inner bushing includes an axial length that is less than the axial span. In such an example, the difference between the axial length of the inner bushing and the axial span can define a clearance. For example, such a clearance can be defined at least in part via a thermal expansion coefficient of the valve shaft and a thermal expansion coefficient of the inner bushing.

As an example, an inner bushing and a valve shaft can be made of different materials.

As an example, a valve shaft can be a unitary shaft.

As an example, a valve shaft can have a length that is greater than approximately six times the average diameter of the shaft.

As an example, a valve shaft can include at least one annular groove. In such an example, at least one seal ring may be disposed at least in part in the annular groove. As an example, at least one seal ring can contact a surface of one of a plurality of bushings.

As an example, an assembly can include a crank arm that is bolted to an outer end of a valve shaft.

As an example, an inner bushing can be pinned.

As an example, a boss can be a boss of a turbine housing. As an example, a boss can be a boss of an exhaust manifold.

As an example, an exhaust bypass valve, in an open state, can allow at least a portion of exhaust gas of an internal combustion engine to bypass one of a plurality of turbocharger stages. In such an example, in the open state of the exhaust bypass valve, a path can exist for at least a portion of exhaust gas of an internal combustion engine to bypass a first turbocharger stage.

As an example, in an assembly, a first turbocharger stage can be a high pressure stage and a second turbocharger stage can be a low pressure stage.

As an example, an assembly for an exhaust bypass valve of a two-stage turbocharger can include a first turbocharger stage and a second turbocharger stage where one of the stages includes a boss that includes a bore; an exhaust bypass valve that includes an arm pivotable to orient the exhaust bypass valve in an open state and a closed state; a valve shaft disposed at least in part in the bore and operatively coupled to the exhaust bypass valve where the valve shaft includes an inner end, an outer end and an axial stop disposed between the inner end and the outer end; a crank arm operatively coupled to the valve shaft; an inner bushing disposed at least in part in the bore and located axially along the valve shaft; and an outer bushing axially fixed at least in part in the bore and located axially along the valve shaft between the axial stop of the valve shaft and the crank arm. In such an example, the crank arm can include an axial stop surface that limits axial movement of the valve shaft.

As an example, an assembly for an exhaust bypass valve of a two-stage turbocharger can include a first turbocharger stage and a second turbocharger stage where one of the stages includes a boss that includes a bore; an exhaust bypass butterfly valve; a valve shaft disposed at least in part in the bore and operatively coupled to the exhaust bypass butterfly valve where the valve shaft includes an inner end, an outer end and an axial stop disposed between the inner end and the outer end; an inner bushing disposed at least in part in the bore and located axially along the valve shaft; and an outer bushing axially fixed at least in part in the bore and located axially along the valve shaft between the axial stop of the valve shaft and the exhaust bypass butterfly valve.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. An assembly for an exhaust bypass valve of a two-stage turbocharger, the assembly comprising:
a first turbocharger stage and a second turbocharger stage wherein one of the stages comprises a boss that comprises a bore wherein the bore comprises an outer bore, an opening to the outer bore, an inner bore, a transition region between the outer bore and the inner bore, an inner opening to the inner bore wherein the transition region transitions from a smaller diameter of the inner bore to a larger diameter of the outer bore;
an exhaust bypass valve that comprises an arm pivotable to orient the exhaust bypass valve in an open state and a closed state;
a valve shaft disposed at least in part in the bore and operatively coupled to the exhaust bypass valve wherein the valve shaft comprises an inner end, an outer end and an axial stop disposed between the inner end and the outer end wherein the axial stop is disposed in the inner bore;
an outer bushing disposed at least in part in the bore and located axially along the valve shaft; and
an inner bushing axially fixed at least in part in the inner bore, partially within a chamber that is an exhaust chamber where the exhaust bypass valve operates and located axially along the valve shaft between a portion of the arm of the exhaust bypass valve and the axial stop of the valve shaft wherein one end of the inner bushing and the axial stop and an opposing end of the inner bushing and a portion of the arm of the exhaust bypass valve define an overall axial clearance that limits axial movement of the valve shaft in the bore of the boss.

2. The assembly of claim 1 wherein the arm of the exhaust bypass valve is fixed to the valve shaft to define an axial span between a portion of the arm and the axial stop.

3. The assembly of claim 2 wherein the inner bushing comprises an axial length that is less than the axial span.

4. The assembly of claim 3 wherein a difference between the axial length of the inner bushing and the axial span defines the overall axial clearance.

5. The assembly of claim 4 wherein the overall axial clearance is defined at least in part via a thermal expansion coefficient of the valve shaft and a thermal expansion coefficient of the inner bushing.

6. The assembly of claim 1 wherein the inner bushing and the valve shaft are made of different materials.

7. The assembly of claim 1 wherein the valve shaft comprises a unitary shaft.

8. The assembly of claim 1 wherein the valve shaft comprises a length that is greater than approximately six times an average diameter of the shaft.

9. The assembly of claim 1 wherein the valve shaft comprises at least one annular groove and comprising at least one seal ring disposed at least in part in the annular groove.

10. The assembly of claim 9 wherein the at least one seal ring contacts a surface of one of the bushings.

11. The assembly of claim 1 comprising a crank arm that is bolted to the outer end of the valve shaft.

12. The assembly of claim 1 wherein the boss comprises a boss of a turbine housing.

13. The assembly of claim 1 wherein the boss comprises a boss of an exhaust manifold.

14. The assembly of claim 1 wherein the exhaust bypass valve, in the open state, allows at least a portion of exhaust gas of an internal combustion engine to bypass one of the turbocharger stages.

* * * * *